United States Patent [19]

Epperly et al.

[11] Patent Number: 5,017,347

[45] Date of Patent: * May 21, 1991

[54] PROCESS FOR NITROGEN OXIDES REDUCTION AND MINIMIZATION OF THE PRODUCTION OF OTHER POLLUTANTS

[75] Inventors: William R. Epperly, New Canaan; James C. Sullivan, Norwalk; Barry N. Sprague, Bethlehem; John H. O'Leary, Danbury, all of Conn.

[73] Assignee: Fuel Tech, Inc., Stamford, Conn.

[*] Notice: The portion of the term of this patent subsequent to Oct. 25, 2005 has been disclaimed.

[21] Appl. No.: 411,902

[22] PCT Filed: Aug. 12, 1988

[86] PCT No.: PCT/US88/02751

§ 371 Date: May 23, 1989

§ 102(e) Date: May 23, 1989

[87] PCT Pub. No.: WO89/02781

PCT Pub. Date: Apr. 6, 1989

Related U.S. Application Data

[63] Continuation-in-part of Ser. No. 50,198, May 14, 1987, Pat. No. 4,780,289, and Ser. No. 14,431, Feb. 13, 1987, Pat. No. 4,770,863, and Ser. No. 22,799, Mar. 6, 1987, abandoned, and Ser. No. 25,350, Mar. 13, 1987, and Ser. No. 25,493, Mar. 13, 1987, abandoned, and Ser. No. 39,013, Apr. 15, 1987, Pat. No. 4,803,059, and Ser. No. 100,128, Sep. 23, 1987, and Ser. No. 108,779, Oct. 14, 1987, and Ser. No. 132,801, Dec. 14, 1987, Pat. No. 4,803,839, and Ser. No. 155,864, Feb. 29, 1988, and a continuation-in-part of Ser. No. 207,292, Jun. 15, 1988.

[51] Int. Cl.$^5$ .......................... C01B 21/00; B01J 8/00
[52] U.S. Cl. ..................................... 423/235; 423/239
[58] Field of Search ................... 423/235, 235 D, 239, 423/239 A

[56] References Cited

U.S. PATENT DOCUMENTS 3,801,696 4/1974 Mark .
3,846,981 11/1974 Paczkowski .
3,900,554 8/1975 Lyon .
4,080,423 3/1978 Smith et al. .
4,081,509 3/1978 Hishinuma et al. .
4,087,372 5/1978 Saitoh et al. .

(List continued on next page.)

FOREIGN PATENT DOCUMENTS 2630202 2/1977 Fed. Rep. of Germany .
51-76166 7/1976 Japan .
51-104948 9/1976 Japan .
50-67669 12/1976 Japan .
5379762 12/1976 Japan .
51-1138 7/1977 Japan .
51-4588 7/1977 Japan .
51-12330 8/1977 Japan .
5189176 2/1978 Japan .
53-033975 3/1978 Japan .
52-42643 11/1978 Japan .
53-130274 11/1978 Japan .
54-38268 3/1979 Japan .
54-51986 4/1979 Japan .
54-72763 6/1979 Japan .
54-119370 9/1979 Japan .
54-123573 9/1979 Japan .
54-158371 12/1979 Japan .
55-44365 3/1980 Japan .
55-49130 4/1980 Japan .
57-190638 11/1982 Japan .
8702023 10/1986 PCT Int'l Appl. .

OTHER PUBLICATIONS

Muzio et al., "Gas Phase Decomposition of Nitric Oxide in Combustion Products", Sixteenth Symposium on Combustion, Cambridge, Mass. 1976, pp. 199-208.
Faucett et al., "Technical Assessment of NO$_x$ Removal Process for Utility Application", EPRI AF-568, EPA/600/7-77/127, Nov. 1977, pp. 187-196.

Primary Examiner—Gregory A. Heller
Attorney, Agent, or Firm—St. Onge Steward Johnston & Reens

[57] ABSTRACT

A process for the reduction of nitrogen oxides in an effluent from the combustion of a carbonaceous fuel while minimizing the production of other pollutants is presented. The process comprises introducing (most commonly by injecting) a nitrogen oxides reducing treatment agent into an effluent according to a nitrogen oxides reducing treatment regimen under conditions such that the treatment agent is operating on the high temperature or right side of its nitrogen oxides reduction versus effluent temperature curve, especially on the high temperature or right side of the curve plateau.

42 Claims, 10 Drawing Sheets

U.S. PATENT DOCUMENTS

| | | | |
|---|---|---|---|
| 4,115,515 | 9/1978 | Tenner et al. | |
| 4,208,386 | 6/1980 | Arand et al. | |
| 4,213,944 | 7/1980 | Azuhata et al. | |
| 4,314,345 | 2/1982 | Shiraishi et al. | |
| 4,325,924 | 4/1982 | Arand et al. | |
| 4,350,669 | 9/1982 | Izumi et al. | |
| 4,388,281 | 6/1983 | Holter et al. | |
| 4,400,362 | 8/1983 | Lerner | |
| 4,419,333 | 12/1983 | Reus et al. | |
| 4,473,536 | 9/1984 | Carberg et al. | |
| 4,473,537 | 9/1984 | Ford et al. | |
| 4,507,269 | 3/1985 | Dean et al. | |
| 4,521,388 | 6/1985 | Samish et al. | |
| 4,565,679 | 1/1986 | Michalak et al. | |
| 4,603,036 | 7/1986 | Botton et al. | |
| 4,624,840 | 11/1986 | Dean et al. | |
| 4,731,233 | 3/1988 | Thompson et al. | |
| 4,770,863 | 9/1988 | Epperly et al. | |
| 4,777,024 | 10/1988 | Epperly et al. | 423/235 |
| 4,780,289 | 10/1988 | Epperly et al. | 423/235 |
| 4,844,878 | 7/1989 | Epperly et al. | 423/235 |
| 4,863,704 | 9/1989 | Epperly et al. | 423/235 |

PROCESS FOR NITROGEN OXIDES REDUCTION AND MINIMIZATION OF THE PRODUCTION OF OTHER POLLUTANTS

RELATED APPLICATIONS

This application is a continuation-in-part of copending and commonly assigned, U.S. patent application Ser. No. 050,198 entitled "Process for Nitrogen Oxides Reduction and Minimization of the Production of Other Pollutants" filed in the names of Epperly, O,Leary and Sullivan on May 14, 1987, now U.S. Pat. No. 4,780,289; copending and commonly assigned U.S. patent application Ser. No. 014,431 entitled "Process for the Reduction of Nitrogen Oxides in an Effluent" filed in the names of Epperly and Sullivan on Feb. 13, 1987 now U.S. Pat. No. 4,770,863; copending and commonly assigned U.S. patent application Ser. No. 022,799 entitled "Process for Reducing Nitrogen Oxides in an Effluent Using a Hydrocarbon or Hydrogen Peroxide", filed in the name of Sullivan on March 6, 1987, now abandoned; copending and commonly assigned U.S. patent application Ser. No. 025,350 entitled "Process for the Reduction of Nitrogen Oxides in an Effluent Using Sugar" filed in the names of Epperly and Sullivan on Mar. 13, 1987; copending and commonly assigned U.S. patent application Ser. No. 025,493 entitled "Process for the Reduction of Nitrogen Oxides in an Effluent Using a Heterocyclic Hydrocarbon" filed in the names of Epperly and Sullivan on Mar. 13, 1987, now abandoned; copending and commonly assigned U.S. patent application Ser. No. 039,013 entitled "Process for the Reduction of Nitrogen Oxides in an Effluent Using a Hydroxy Amino Hydrocarbon" filed in the names of Sullivan and Epperly on Apr. 15, 1987 now U.S. Pat. No. 4,803,059, ; copending and commonly assigned U.S. patent application Ser. No. 100,128 entitled "Process for the Reduction of Nitrogen Oxides in an Effluent" filed in the names of Epperly, Sullivan and Sprague on Sept. 23, 1987; copending and commonly assigned U.S. patent application Ser. No. 108,779 entitled "Process for the Reduction of Nitrogen Oxides in an Effluent" filed in the names of Epperly, Sullivan and Sprague on Oct. 14, 1987; copending and commonly assigned U.S. patent application Ser. No. 132,801 entitled "Ammonia Scrubbing" filed in the names of Epperly, Peter-Hoblyn and Sullivan on Dec. 14, 1987 now U.S. Pat. No. 4,803,839; copending and commonly assigned U.S. patent application Ser. No. 155,864 entitled "Process for Nitrogen Oxides Reduction with Minimization of the Production of Other Pollutants" filed in the names of Epperly, O,Leary, Sullivan and Sprague on Feb. 29, 1988; copending and commonly assigned U.S. patent application Ser. No. 207,292 entitled "Multi-stage Process for Reduced the Cartration of Pollutants in an Effluent using an Ammonium Salt", filed June 15, 1988 and Copending and commonly assigned U.S. patent application Serial No. 207,382 entitled "Process for Nitrogen Oxides Reduction With Minimization of the Production of Other Pollutants" filed in the names of Epperly, O,Leary, Sullivan and Sprague on June 15, 1988, the disclosures of which are incorporated herein by reference.

TECHNICAL FIELD

The present invention relates to a process for the reduction of nitrogen oxides ($NO_x$) in the effluent, especially the oxygen-rich effluent, from the combustion of a carbonaceous fuel while minimizing the production of other pollutants, such as ammonia ($NH_3$) and/or carbon monoxide (CO).

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used in suspension fired boilers such as large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. Nitrogen oxides can form even in circulating fluidized bed boilers which operate at temperatures which typically range from 1300° F. to 1700° F., as well as gas turbines and diesel engines.

Nitrogen oxides are troublesome pollutants which are found in the combustion effluent streams of boilers when fired as described above, and comprise a major irritant in smog. It is further believed that nitrogen oxides can undergo a process known as photo-chemical smog formation, through a series of reactions in the presence of sunlight and hydrocarbons. Moreover, nitrogen oxides comprise a significant contributor to acid rain.

Unfortunately, the temperatures within a suspension fired or circulating fluidized bed boiler render most common methods of reducing $NO_x$ concentrations, such as effluent scrubbing or catalyst grids, either uneconomical, infeasible, or both, particularly when combined with the need to minimize the production of other pollutants such as ammonia ($NH_3$) and/or carbon monoxide (CO).

BACKGROUND ART

Processes and compositions for the reduction of nitrogen oxides in an effluent from the combustion of a carbonaceous fuel have been developed extensively over recent years. With the increased attention to the health risks and environmental damage caused by agents such as smog and acid rain, it is expected that $NO_x$ reduction research will continue to be pursued.

In the past, most processes for the reduction of nitrogen oxides levels have concentrated on achieving maximum $NO_x$ reductions without addressing the problems raised by the production of other pollutants, such as ammonia and carbon monoxide. More recently, in a unique application of $NO_x$ reducing principles, Epperly, Peter-Hoblyn, Shulof and Sullivan, in U.S. patent application entitled "Multi-Stage Process for Reducing the Concentration of Pollutants in an Effluent" having Ser. No. 022,716, filed Mar. 6, 1987, disclose a method of achieving substantial $NO_x$ reductions without the production of a major amount of other pollutants through a multiple stage injection process. The disclosed process, though, is more concerned with maintaining a low level of other pollutants than with achieving a maximum amount of nitrogen oxides reduction because each injection is designed not to maximize $NO_x$ reduction but to minimize the production of other pollutants.

Although effective for reducing the level of nitrogen oxides in an effluent, the fact that the $NO_x$ reduction is not maximized at each injection indicates that further reductions are possible. Furthermore, even in the prior art disclosures which teach methods which may lead to a lessened production of other pollutants, most do so under relatively static conditions and do not account or compensate for changes in effluent conditions, such as effluent temperature variations as load varies, which are often encountered. There exists a present need, therefore, for a process which can achieve maximum nitrogen oxides reductions without the production of substantial amounts of other pollutants under practical effluent conditions.

DISCLOSURE OF INVENTION

The present invention meets this need and provides the ability to control $NO_x$ in concert with other pollutants under varying as well as constant load conditions in a manner and to a degree never before available. According to one aspect, the process comprises introducing (most commonly by injecting) a $NO_x$ reducing treatment agent into an effluent according to a $NO_x$ reducing treatment regimen under conditions such that the treatment agent is operating on the high temperature or right side of its nitrogen oxides reduction versus effluent temperature curve, especially on the high temperature or right side of the curve plateau.

An object of the present invention is to achieve significant reductions in nitrogen oxides levels without the production of substantial amounts of other pollutants by effecting a treatment regimen while monitoring the condition of the effluent and, when a change in effluent condition is observed, adjusting the treatment regimen by varying one or more treatment regimen parameters to effect an adjusted treatment regimen which operates on its nitrogen oxides reduction versus effluent temperature curve further to the right than did the originally-effected treatment regimen on its nitrogen oxides reduction versus effluent temperature curve.

Another object of the present invention is to achieve significant reductions in nitrogen oxides levels without the production of substantial amounts of other pollutants by determining the nitrogen oxides reduction versus effluent temperature curves for each of a plurality of treatment regimen and effecting the treatment regimen which will, under the effluent condition currently existing, operate furthest to the right on its curve than the others.

Still another object of the present invention is to achieve significant reductions in nitrogen oxides levels without the production of substantial amount of other pollutants by effecting a treatment regimen and adjusting the position of introduction of the treatment regimen to cause the introduction to be performed at a different effluent temperature and thereby effect the treatment regimen to operate more towards the right side of the plateau of its nitrogen oxides reduction versus effluent temperature curve.

Yet another object of the present invention is to achieve significant reductions in nitrogen oxides levels without the production of substantial amounts of other pollutants by effecting a treatment regimen under conditions effective to reduce the effluent nitrogen oxides concentration and then varying one or more treatment regimen parameters to shift the treatment regimen nitrogen oxides reduction versus effluent temperature curve towards the right side of the curve plateau.

Still another object of the present invention is to achieve significant reductions in nitrogen oxides levels without the production of substantial amounts of other pollutants by effecting a treatment regimen, determining the position on its nitrogen oxides reduction versus effluent temperature curve at which the treatment regimen is operating and varyi.ng one or more treatment regimen parameters so that the varied treatment regimen is operating on its nitrogen oxides reduction versus effluent temperature curve further to the right.

Another object of the present invention is to achieve significant reductions in nitrogen oxides levels without the production of substantial amounts of other pollutants by effecting a treatment regimen and varying one or more treatment regimen parameters to drive the reaction or series of reactions by which the treatment regimen reduces nitrogen oxides towards a reduction of the production of other pollutants while substantially maintaining the level of nitrogen oxides reductions.

Yet another object of the present invention is to achieve significant reductions in nitrogen oxides levels without the production of substantial amounts of other pollutants by effecting a treatment regimen while monitoring boiler operating load and varying one or more treatment regimen parameters when a significant change in boiler load is observed to effect an adjusted treatment regimen Another object of the present invention is to achieve significant reductions in nitrogen oxides levels without the production of substantial amounts of other pollutants by effecting a treatment regimen under conditions where the treatment regimen is operating on its nitrogen oxides reduction versus effluent temperature curve at a position to the right of the curve plateau and adjusting one or more treatment regimen parameters to operate the adjusted treatment regimen towards its curve plateau.

Still another object of the present invention is to ascertain the condition of the effluent by effecting a treatment regimen, measuring the condition of the effluent and, by reference to the nitrogen oxides reduction versus effluent temperature curve, determine what the condition of the effluent was prior to the treatment regimen being effected Yet another object of the present invention is to maintain nitrogen oxides levels in the effluent below a certain specified amount while also maintaining the level of other pollutants below a certain specified amount by effecting treatment regimen which operate toward or on the right side of their nitrogen oxides reduction versus effluent temperature curve.

Another object of the present invention is to accomplish any or all of the above objects when boiler operating conditions and loads are varying.

BRIEF DESCRIPTION OF THE DRAWINGS

These and other objects will be described and the present invention better understood and its advantages more apparent in view of the following detailed description, especially when read with reference to the appended drawings, wherein.

DEFINITIONS

Figure 1:
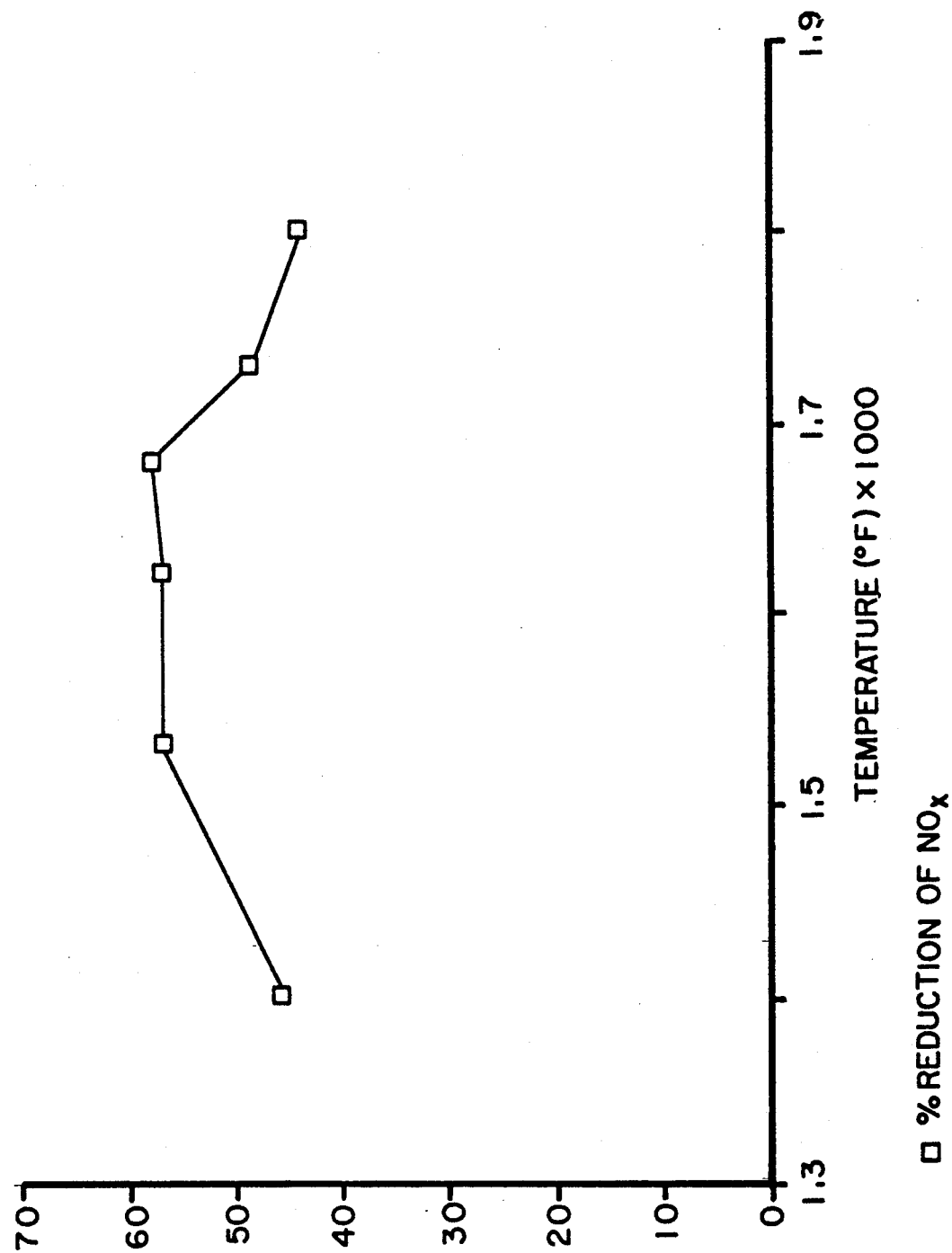
FIGS. 1 and 1a graphically represent the results of Example I.

As used in this description, the term:

"nitrogen oxides reduction versus effluent temperature curve" refers to a plot of the data points generated when a treatment regimen is effected by introducing a treatment agent into an effluent over a range of effluent temperatures and the nitrogen oxides reduction at each introduction temperature is measured (and usually expressed in terms of percent of baseline);

"curve plateau" reters to that region of a nitrogen oxides reduction versus effluent temperature curve where the $NO_x$ reduction is substantially maximized over a range of temperatures and preferably encompasses at least two data points (of course a skilled artisan will recognize that a curve plateau will not necessarily be flat due to "data scatter" and other practical data generation effects);

"high temperature side" or "right side" refer to any point on the subject nitrogen oxides reduction versus effluent temperature curve which represents the reduction achieved when a treatment regimen is effected at a higher temperature than the original temperature at which a treatment regimen was effected;

"treatment regimen" refers to the introduction (such as by injection) of a treatment agent into an effluent and the conditions under which the treatment agent is introduced, such as treatment agent components (by which is meant the ingredients of the treatment agent), treatment agent dilution (by which is meant the concentration of treatment agent components when the treatment agent used comprises a solution), relative presence of treatment agent components (by which is meant the relative weight ratio or fractions of the components which form the chemical formulation which makes up the treatment agent), etc.;

"treatment agent" refers to a composition comprising at least one reductant chemical, i.e., a pollution reducing chemical capable of reducing $NO_x$, sulfur oxides ($SO_x$) or other pollutants by facilitating a reaction (the term "reaction" will be understood to refer to a single reaction or a series of reactions), and, preferably, with a solvent;

"effluent condition" or "condition of the effluent" refers to the existing state of any one or more parameters which can be used to characterize the effluent, such as temperature, nitrogen oxides level, ammonia level, carbon monoxide level, excess oxygen level, sulfur oxides level, etc.;

"normalized stoichiometric ratio" (NSR) refers to the ratio of the concentration of reducing-radicals such as $NH_x$ radicals ($NH_x$ radicals, with x being an integer, are believed to be the moiety contributed by the treatment agent which facilitates the series of reactions resulting in $NO_x$ breakdown) to the concentration of nitrogen oxides in the effluent and can be expressed as $[NH_x]/[NO_x]$ (alternatively, the molar ratio of the treatment agent to the $NO_x$ concentration can be used in place of NSR when the chemistry of reduction is not well defined; the term NSR as used herein will also be understood to encompass molar ratio when appropriate);

"urea" and "ammonia" refer to the compounds urea and ammonia themselves, as well as compounds equivalent in effect. Among those compounds are ammonium carbonate, ammonium formate, ammonium oxalate, ammonium hydroxide and various stable amines, and their solutions in water;

"oxygenated hydrocarbon" refers to substituted and unsubstituted, straight or branch-chain aliphatic and cyclic, heterocyclic and aromatic hydrocarbons having at least one oxygen either in or bonded directly to the primary hydrocarbon chain or in or bonded directly to a substituent group, and mixtures thereof, typical substituent groups of which include carboxylic acid groups (COOH), peroxide groups (—O—O—), carbonyl groups (C=O), hydroxy groups (OH), ether groups (—O—), ester groups (COOR), etc.;

"hydroxy amino hydrocarbon" refers to any cyclic, heterocyclic, aromatic, straight or branched chain, substituted or unsubstituted hydrocarbon having at least one substituent comprising a hydroxy or a carboxy group and at least one primary, secondary or tertiary amino group;

"ammonium salt of an organic acid having a carbon to nitrogen ratio of greater than 1:1" refers to salts which can be formed by the neutralization of ammonium hydroxide with an organic acid, preferably a carboxylic acid (i.e., an acid having one or more carboxyl (COOH) groups) If the acid has more than one carboxylate group, they may be partially or . completely neutralized by ammonium hydroxide. The ratio of carbon to nitrogen in the salt is greater than 1:1, meaning that there is more than one carbon per each nitrogen in the compound, most preferably there are at least two carbons per each nitrogen in the compound;

"five or six-membered heterocyclic hydrocarbon having at least one cyclic nitrogen" refers to a cyclic five or six member hydrocarbon in which one or more of the atoms in the ring is nitrogen. The cyclic compounds can be either saturated or unsaturated;

"heterocyclic hydrocarbon having at least one cyclic oxygen" refers to a ringed hydrocarbon compound having at least one ring oxygen;

"alcohol" refers to a hydrocarbon derivative in which one or more hydrogen atoms have been replaced by a hydroxy group;

"sugar" refers to a number of useful saccharide materials which are capable of decreasing the $NO_x$ concentration in an effluent under conditions as described herein, including non-reducing and reducing water soluble mono-saccharides and the reducing and non-reducing polysaccharides and their degradation products, such as pentoses including aldopentoses, methyl pentoses, keptopentoses like xylose and arabinose, deoxyaldoses like rhaminose, hexoses and reducing saccharides such as aldo hexoses like glucose, galactose and mannose, ketohexoses like fructose and sorbose, disaccharides like lactose and maltose, non-reducing disaccharides like sucrose and other polysaccharides such as dextrin and raffinose, hydrolyzed starches which contain as their constituents oligosaccharides, and water dispersible polysaccharides;

"furfural" refers to furfural itself as well as substituted furfural. Typical substituents.include side chains comprising straight and branched-chain, substituted and unsubstituted aliphatic groups, oxygenated hydrocarbon groups and amino groups;

"amino acid" refers to any organic compound containing an amine group and a carboxylic acid group;

TREATMENT AGENTS

Appropriate treatment agents known as being effective at the reduction of nitrogen oxides include aqueous solutions of urea or ammonia, or gaseous ammonia, as disclosed by Arand et al. in U.S. Pat. No. 4,208,386, and by Bowers U.S. Pat. No. 4,719,092 entitled "Reduction of Nitrogen-Based Pollutants Through the Use of Urea Solutions Containing Oxygenated Hydrocarbon Solvents", or an aqueous solution of ammonia, or gaseous ammonia itself, as disclosed by Lyon in U.S. Pat. No. 3,900,554, the disclosures of which are incorporated herein by reference.

Other suitable treatment agents for introduction into an effluent for nitrogen oxides reductions are disclosed in Bowers U.S. Pat. No. 4,751,065 entitled "Reduction of Nitrogen- and Carbon-Based Pollutants"; copending and commonly assigned U.S. patent application Ser. No. 014,431 entitled "Process for the Reduction of Nitrogen Oxides in an Effluent" filed in the names of Epperly and Sullivan on Feb. 13, 1987; copending and commonly assigned U.S. patent application Ser. No. 025,350 entitled "Process for the Reduction of Nitrogen Oxides in an Effluent Using Sugar" filed in the names of Epperly and Sullivan on Mar. 13, 1987; copending and commonly assigned U.S. patent application Ser. No. 025,493 entitled "Process for the Reduction of Nitrogen Oxides in an Effluent Using a Heterocyclic Hydrocarbon" filed in the names of Epperly and Sullivan on Mar. 13, 1987; copending and commonly assigned U.S. patent application Ser. No. 039,013 entitled "Process for the Reduction of Nitrogen Oxides in an Effluent Using a Hydroxy Amino Hydrocarbon" filed in the names of Sullivan and Epperly on Apr. 15, 1987; copending and commonly assigned U.S. patent application Ser. No. 100,128 entitled "Process for the Reduction of Nitrogen Oxides in an Effluent" filed in the names of Epperly, Sullivan and Sprague on Sept. 23, 1987; copending and commonly assigned U.S. patent application Ser. No. 108,779 entitled "Process for the Reduction of Nitrogen Oxides in an Effluent" filed in the names of Epperly, Sullivan and Sprague on October 14, 1987; copending and commonly assigned U.S. patent application Ser. No. 207,292 entitled "Multi-Stage Process for Reducing the Concentration of Pollutants in an Effluent Using an Ammonium Salt" filed in the names of Epperly, Peter-Hoblyn, Shulof, Jr., Sullivan and Sprague on June 15, 1988; and copending and commonly assigned U.S. patent application Ser. No. 207,382 entitled "Process for Nitrogen Oxides Reduction With Minimization of the Production of Other Pollutants" filed in the names of Epperly, O,Leary, Sullivan and Sprague on June 15, 1988, the disclosures of which are incorporated herein by reference.

The disclosed treatment agents include aqueous solutions of ammonia or urea, enhanced with suitable enhancers such as hexamethylenetetramine (HMTA), a paraffinic hydrocarbon, an olefinic hydrocarbon, an aromatic hydrocarbon, an oxygenated hydrocarbon (such as acetone, sugar, especially sucrose, d-galactose and molasses, an alcohol, especially ethylene glycol, methanol, furfurylalcohol, 1,3 butylene glycol, tetrahydrofuryl alcohol, 2,5-furandimethanol, a lignin derivative, especially $NH_4$-lignosulfonate and calcium lignosulfonate, a carboxylic acid, especially 2-furoic acid, gluconic acid, citric acid, formic acid, coumalic acid, 2,3,4,5-tetracarboxylic acid, furylacrylic acid, barbituric acid, oxalic acid and mucic acid, a peroxide, an aldehyde, an ether, an ester, a ketone, glycerin, tetrahydrofuran, acetone, 1,3 dioxolane, 1,4 dioxane, tetrahydrofuran, furfurylamine, n-butyl acetate, methylal, furan, fish oil, furfuryl acetate, tetrahydrofuran tetrahydrofurylamine, tetrahydropyran, mannitol, hexamethylenediamine and acetic anhydride), an ammonium salt of an organic acid having a carbon to nitrogen ratio of greater than 1:1 (such as ammonium acetate, ammonium and diammonium adipate, ammonium benzoate, ammonium binoxalate, ammonium caprylate, ammonium, diammonium and triammonium citrate, ammonium crotonate, ammonium and diammonium dodecanoate, ammonium and diammonium fumarate, ammonium heptanoate, ammonium linolenate, ammonium and diammonium malate, ammonium mono butyrate, ammonium oleate, ammonium and diammonium pthalate, ammonium propionate, ammonium salicylate, ammonium and diammonium succinate ammonium and diammonium tartarate, and ammonium, diammonium and triammonium trimellitate), a hydroxy amino hydrocarbon (such as alkanolamines, amino acids and protein-containing compositions), a heterocyclic hydrocarbon having at least one cyclic oxygen (such as furfural and derivatives of furfural), a five or six membered heterocyclic hydrocarbon having at least one cyclic nitrogen (such as piperazine, piperidine, pyridine, pyrazine, pyrazole, imidazole, oxazolidone, pyrrole, pyrrolidine), hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea and mixtures thereof, as well as aqueous solutions of the enhancers themselves.

Additional treatment agents which may be introduced into an effluent to reduce the effluent nitrogen oxides level under certain conditions comprise hydrocarbons, such as an oxygenated hydrocarbon, a nitrogenated hydrocarbon or hydrogen peroxide, disclosed in copending and commonly assigned U.S. patent application entitled "Process for Reducing Nitrogen Oxides in an Effluent Using a Hydrocarbon or Hydrogen Peroxide" having Ser. No. 022,799, filed in the name of Sullivan on Mar. 6, 1987 and copending and commonly assigned U.S. patent application Ser. No. 155,894 entitled "Process for Nitrogen Oxides Reduction with Minimization of the Production of Other Pollutants" filed in the names of Epperly, O,Leary, Sullivan and Sprague on Feb. 2, 1988, the disclosures of which are incorporated herein by reference. Such treatment agents include monoethanolamine and amino acetic acid (glycine). Ethylene glycol, methanol, furfural, sugar and glycerol are preferred oxygenated hydrocarbons of these, with ethylene glycol, methanol and sugar being most preferred. Other hydrocarbons which can advantageously be employed include nitrogenated hydrocarbons such as monomethylamine, triethylene tetramine, hexamethylenediamine, tetraethylene pentamine, bis-hexamethylene triamine, polyamine HpA, 1,2-diaminopropane, N,N-dimethylethylenediamine, tetramethylethylenediamine, 2-methylaziridine, bis (3-aminopropyl) ethylenediamine, tetramethyldiaminomethane, ethylenediamine and diethylenetriamine. Mixtures of polyols, such as those mixtures of low molecular weight polyols known as hydrogenated starch hydrosylates, can also be advantageously employed. Additional hydrocarbons which are suitable for use in the present invention include paraffinic, olefinic and aromatic hydrocarbons, including naphtha-based hydrocarbons, and mixtures thereof.

BEST MODE FOR CARRYING OUT THE INVENTION

The nitrogen oxides reduction versus effluent temperature curve for a treatment regimen comprises a curve plateau, which, as described above, indicates where the $NO_x$ reduction elicited by the treatment regimen is maximized and that such maximum level is substantially maintained over a range of effluent temperatures. An exemplary nitrogen oxides reduction versus effluent temperature curve for a treatment regimen disclosed as being an effective nitrogen oxides reducing treatment regimen is reproduced as FIG. 1. FIG. 1 is the nitroge oxides reduction versus effluent temperature curve for a treatment regimen comprising a treatment agent which comprises 10% by weight of urea, 4% by weight of hexamethylenetetramine and 10% by weight of furfural, which is injected into an effluent at the rato of 300 ml/hr. and an excess of oxygen in the effluent of 3.0% by volume.

The curve plateau for FIG. 1 will be recognized as the nitrogen oxides reduction achieved by effecting the disclosed treatment regimen between effluent temperatures of 1530° F. and 1680° F. (the skilled artisan will recognize that due to normal experimental variations, the curve plateau, and indeed the nitrogen oxides reduction versus effluent temperature curve itself, for any given treatment regimen will show minor variations each time it is experimentally derived). This temperature range, it will be observed, provides the maximum nitrogen oxides reduction for this treatment regimen.

Merely maximizing the nitrogen oxides reduction, though, is not enough. Of concern is not only the nitrogen oxides level in the effluent, but also the level of other pollutants, such as ammonia and carbon monoxide which are often produced in the $NO_x$ reducing process. For instance, when $NO_x$ reduction is achieved by using treatment agent comprising urea or ammonia alone, ammonia is produced, whereas when $NO_x$ reduction is achieved by use of treatment agent comprising urea or ammonia enhanced with a disclosed enhancer, or by use of a hydrocarbon treatment agent, ammonia and carbon monoxide are produced.

The presence of ammonia in the effluent should be avoided because, among other reasons, it can react with $SO_3^=$ to form ammonium bisulfate which can foul heat exchange surfaces in a boiler. Moreover, ammonia has detrimental effects on ambient air quality, as has carbon monoxide If the maximization of the nitrogen oxides level brings about the production of significant amounts of other pollutants, then such maximization is counterproductive. As discussed above, the prior art has attempted to rectify this by eliciting only that level of nitrogen oxides reduction as can be achieved without the production of other pollutants.

Surprisingly, a process for maximizing the nitrogen oxides reduction while minimizing the production of other pollutants has now been found. Alternatively, the process can achieve desired specified "target" maximum levels of nitrogen oxides and other pollutants in the effluent. It has been determined that operation on the high temperature or right side of the nitrogen oxides reduction versus effluent temperature curve of a treatment regimen substantially reduces the production of other pollutants such as ammonia and carbon monoxide. In fact, it has been found that operation on a nitrogen oxides reduction versus effluent temperature curve plateau (or region adjacent the plateau) at any point further to the right of present operation will reduce the production of other pollutants while substantially maintaining maximum nitrogen oxides reduction or the target level of $NO_x$ in the effluent.

Figure 1A:
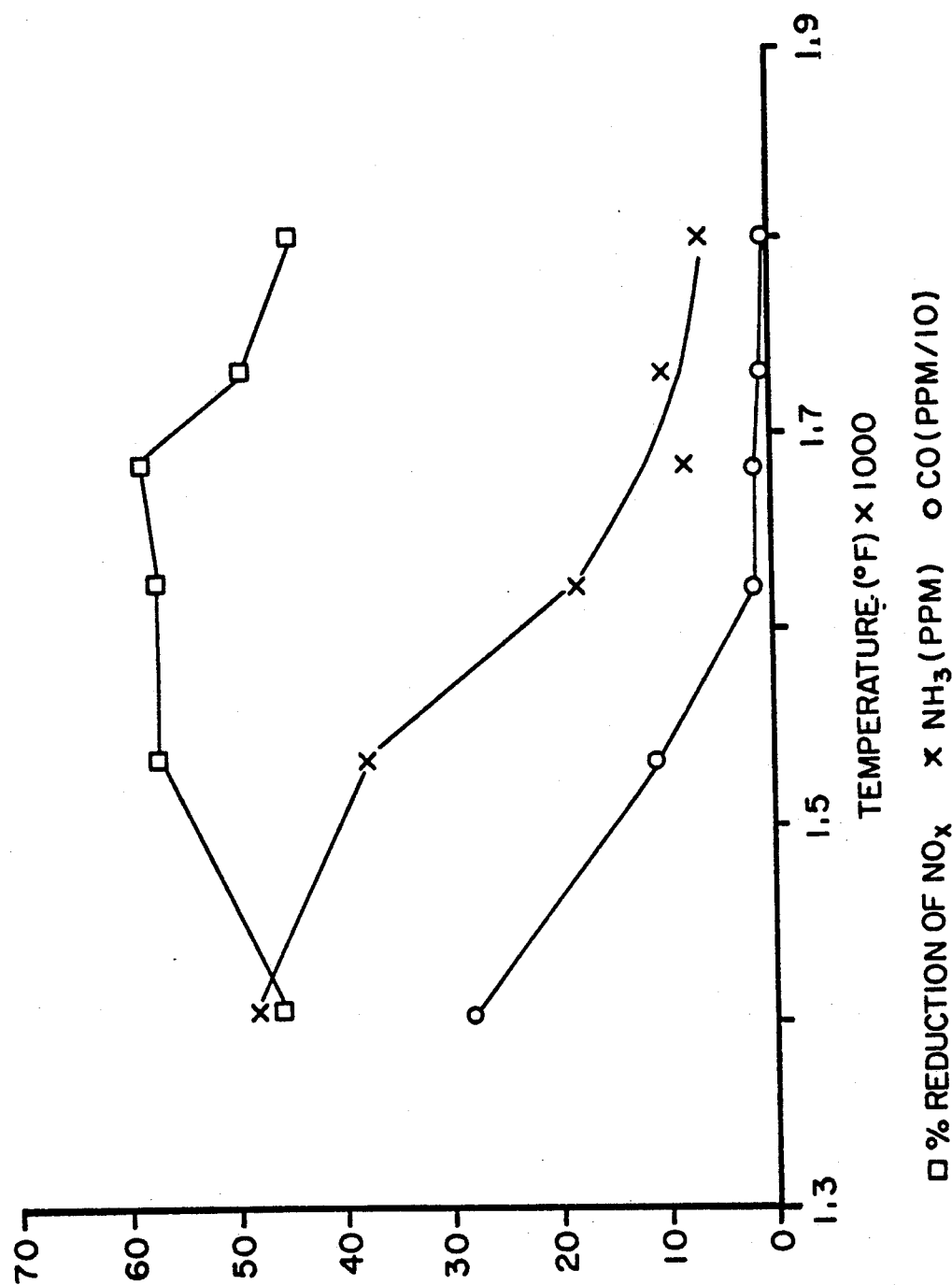

This surprising and advantageous result is aptly demonstrated by reference to FIGS. 1 and 1a, which graphically represent the results of Example I As previously discussed, FIG. 1 reproduces the nitrogen oxides reduction versus effluent temperature curve for a treatment regimen which is effective at reducing the nitrogen oxides level in an effluent from the combustion of a carbonac.eous fuel. FIG. 1a reproduces that same nitrogen oxides reduction versus effluent temperature curve and further has superimposed thereon the ammonia and carbon monoxide levels observed at each point on the curve. It can be seen that although $NO_x$ reduction is maximized throughout the curve plateau (i.e., injection in the effluent temperature range of about 1530° F. to about 1680° F. ), performing the injection further to the right on the curve plateau (i.e., at higher temperatures in the plateau temperature range) leads to substantially reduced production of ammonia and carbon monoxide.

Operation further to the right on the curve can be achieved in one of two methods First, the position on the curve at which the treatment regimen being used is being effected can be translated further to the right by effecting the treatment regimen at a higher effluent temperature. It will readily be observed by reference to FIGS. 1 and 1a that effecting the treatment regimen at a higher effluent temperature will translate the position of operation on the curve further to the right, thereby reducing the production of other pollutants while maintaining maximum nitrogen oxides reduction.

Effecting the treatment regimen at a higher effluent temperature can be accomplished by performing the treatment agent introduction at a location where the effluent temperature is higher, i.e., at a location upstream (or closer to the flame zone) from the original introduction location This method for effecting the treatment regimen at a higher effluent temperature can oftimes be impractical because access to the boiler nterior is often limited to specific points, due to water tubing, etc. Introduction at a location where the effluent temperature is at a desired level, therefore, is often not possible Operation at a much higher effluent temperature can translate the position of operation on the curve too far to the right and off the plateau, thereby decreasing $NO_x$ reduction.

Altering the operating load of the boiler (i.e., fuel supply rate) will also cause a change in effluent temperature and, theoretically at least, be used to increase effluent temperature at the treatment agent introduction location by increasing operating load. In practice, though, altering the boiler operating load is not preferred because the effluent condition is altered in more than the temperature parameter, as will be discussed in more detail below. Nitrogen oxides level, as well as other parameters such as ammonia level and carbon monoxide level, are altered along with effluent temperature. Furthermore, the boiler operating load is usually maintained at a certain level to produce a specific, required output and is not available as a factor which can be altered to achieve $NO_x$ reduction.

Figure 2:
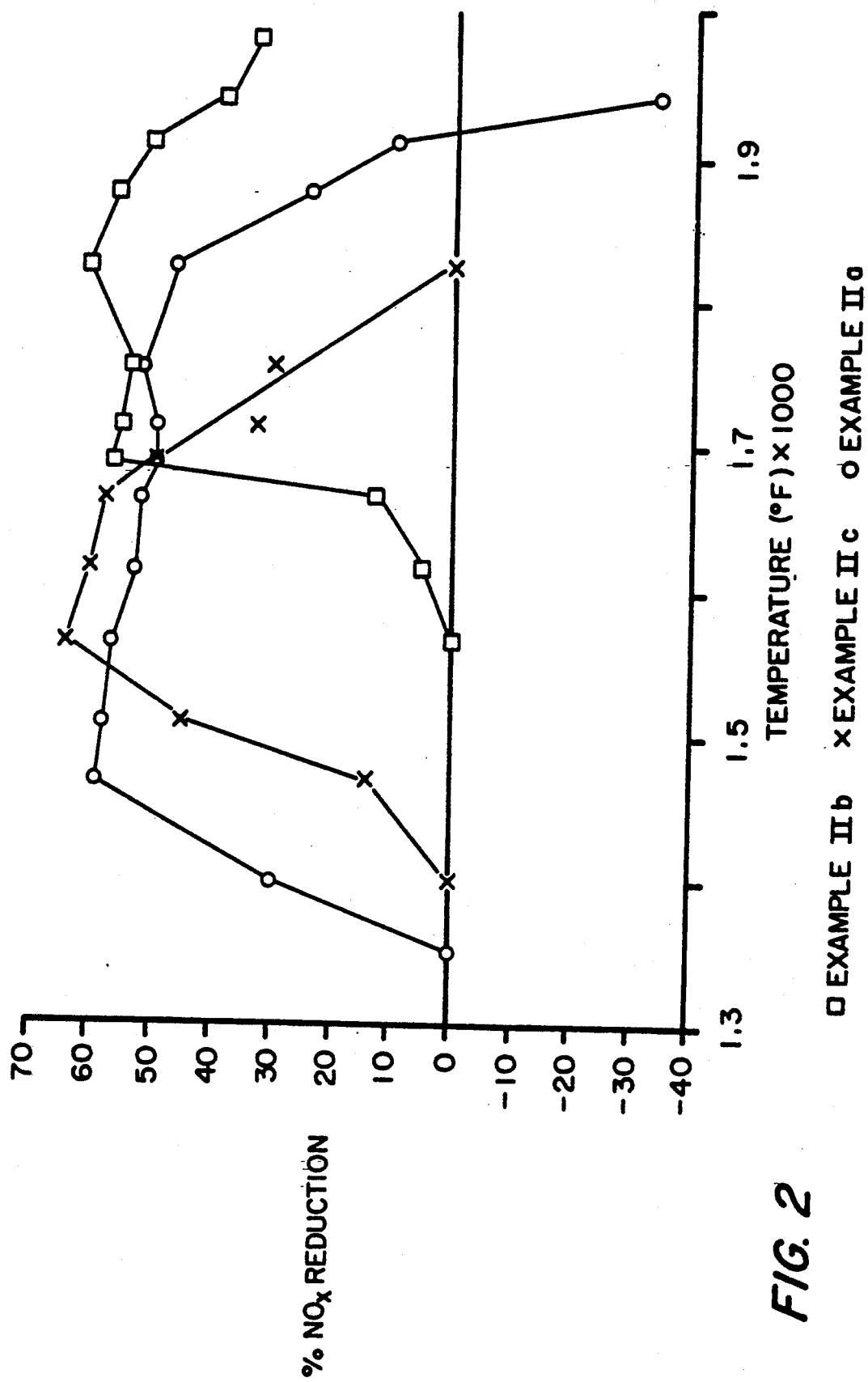
FIG. 2 graphically represents the results of Examples IIa, IIb and IIc.

The second method for operating further to the right on the curve is to vary one or more of the parameters of the treatment regimen being effected. For instance, the varied parameter can be the components of the treatment agent, the dilution of the treatment agent when in solution with a concommitant variation in treatment agent introduction rate to maintain the NSR of the treatment regimen (when a non-nitrogenous treatment agent is being introduced, it is the weight ratio which is maintained when dilution and introduction rate are varied), the relative presence of treatment agent components, or combinations of any of the above By varying treatment regimen parameters, the original nitrogen oxides reduction versus effluent temperature curve is replaced by the nitrogen oxides reduction versus effluent temperature curve for the varied treatment regimen Selection of the parameter(s) to be varied and in what way they are varied can replace the original curve with a curve which is "shifted" to the left, thereby leading to operation on the shifted curve at a position further to the right This treatx:ent regimen varying method for operating further to the right on the curve is illustrated by reference to FIG. 2, which graphically represents the results of Example II. FIG. 2 provides the nitrogen oxides reduction versus effluent temperature curve plateau for three treatment regimens which each comprise introducing a treatment agent into an effluent over a range of effluent temperatures and at an introduction rate of 300 ml/hr. and an excess of oxygen of 3.0% by volume. The treatment agent introduced for the first treatment regimen comprises an aqueous solution of 10% urea and 15% furfural; the treatment agent introduced for the second treatment regimen comprises an aqueous solution of 10% urea; and the treatment agent introduced for the third treatment regimen comprises an aqueous solution of 10% urea and 15% ethylene glycol. It will readily be observed that varying the treatment regimen by altering the treatment agent components between the three illustrated treatment agents can shift or alter the curve and thereby enable maintainance of the treatment regimen operating on the right side of the curve.

For example, if the treatment regimen being effected comprises a treatment agent which is an aqueous solution of 10% urea, and the effluent temperature at the treatment location is 1755° F. , thereby operating toward the left side of the treatment regimen nitrogen oxides reduction versus effluent temperature curve plateau, then varying the treatment regimen by varying the treatment agent components by injecting 15% furfural with the 10% urea replaces the original curve with a curve at which introduction at that effluent temperature operates further towards the right side of the curve plateau. Likewise, if the treatment regimen being effected comprises a treatment agent which is an aqueous solution of 10% urea and 15% furfural, and the effluent temperature at the point of introduction is 1665° F. , thereby operating near the midpoint of the treatment regimen nitrogen oxides reduction versus effluent temperature curve platea, then varying the treatment regimen to vary the treatment agent to replace the 15% furfural with 15% ethylene glycol replaces the original curve with a curve at which introduction at that effluent temperature operates further towards the right side of the curve plateau.

Of course, the two methods for operating further to the right on the curve plateau disclosed according to the present invention are not mutually exclusive, but can in fact be combined In other words, the effluent temperature can be varied along with one or more treatment regimen parameters Although it is possible to translate the performance of the treatment regimen further to the right on its curve plateau by effecting the treatment regimen at a higher temperature (i.e., by injecting at a location where the effluent temperature is higher), as discussed above it is more likely that the $NO_x$ reduction will be maximized while minimizing the production of other pollutants by the second of the two disclosed methods, i.e., by varying one or more treatment regimen parameters. The adjustment (or varying) of the treatment regimen is performed to drive the reaction by which the treatment agent facilitates the reduction of $NO_x$ towards the right side of the curve plateau.

As discussed above, varying one or more treatment regimen parameters serves to produce an adjusted (or new) treatment regimen which will have a different (or shifted) nitrogen oxides reduction versus effluent temperature curve compared to the original treatment regimen. By prior analysis of possible treatment regimens and knowledge of their particular nitrogen oxides reduction versus effluent temperature curves, one can determine the treatment regimen that will, when effected in place of the original treatment regimen, operate further to the right on its curve than the original treatment regimen operated on its curve. In fact, one can predict which will operate furthest to the right on the curve plateau under the particular conditions at which injection is desired (i.e., the effluent temperature at the location for injection).

Furthermore, if the effluent temperature at the injection location is known, prior knowledge of the nitrogen oxides reduction versus effluent temperature curves of available treatment regimens will allow initial selection of the treatment regimen which operates furthest to the right while remaining on the curve plateau, eliminating the need for varying any of the parameters, except when boiler operating load changes.

Figure 3A:
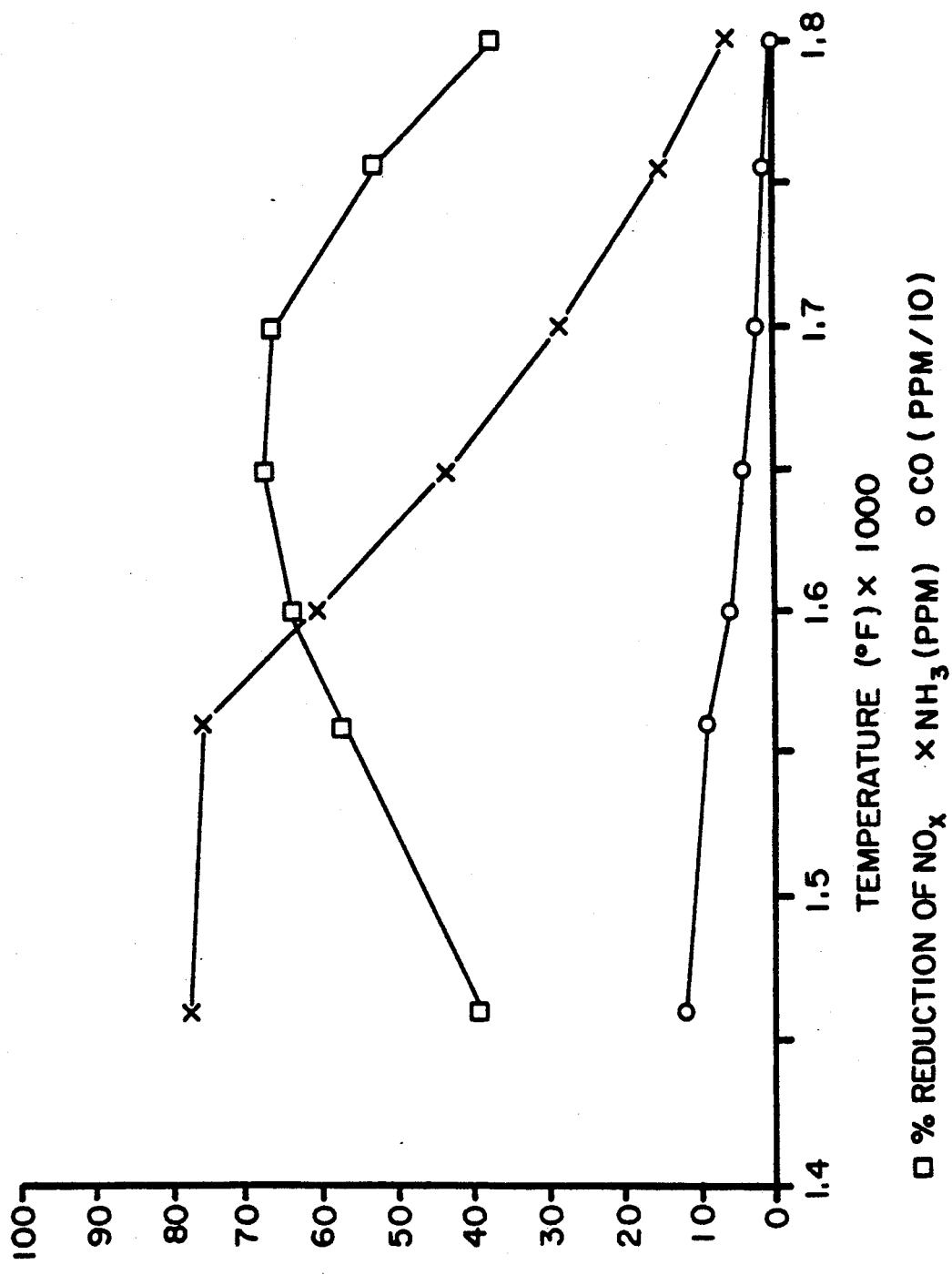
FIGS. 3a–c graphically represent the results of Examples IIIa, IIIb and IIIc.
Figure 3B:
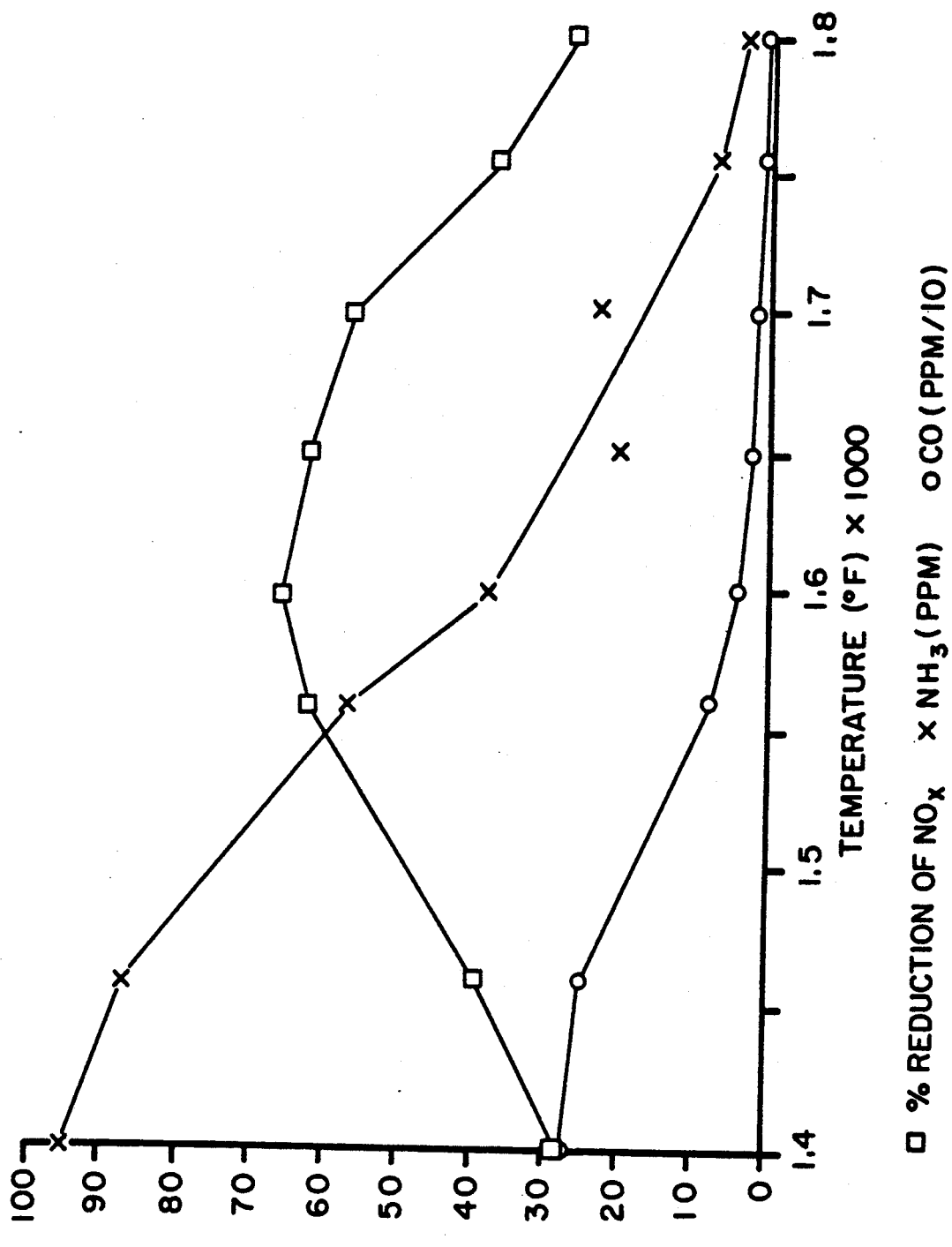
Figure 3C:
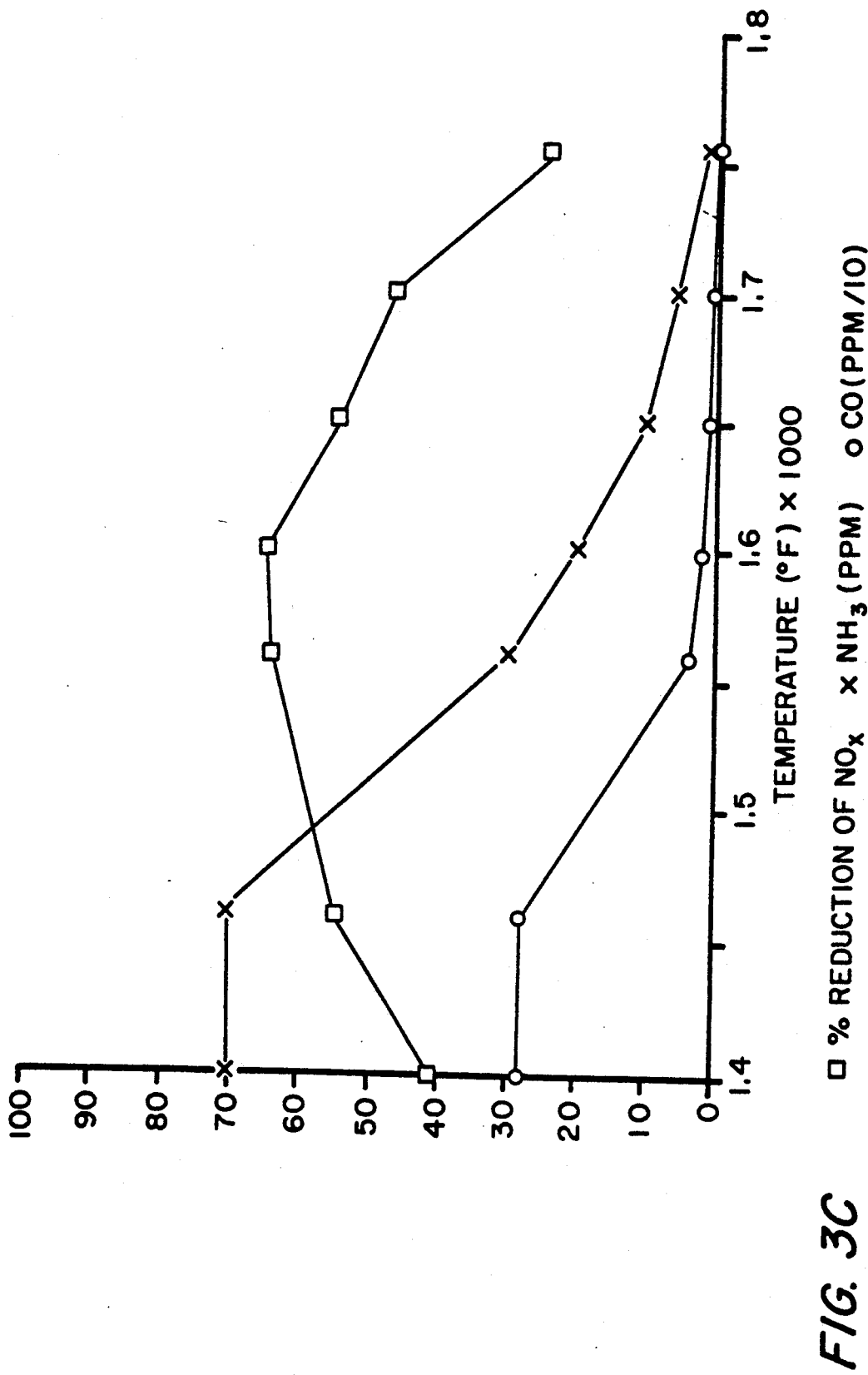

For instance, as illustrated in FIGS. 3a-3c, which graphically reproduce the results of Examples IIIa-IIIc, the nitrogen oxides reduction versus effluent temperature curve for a plurality of treatment regimens, such as aqueous solutions comprising 10% by weight of urea and varying amounts of ethylene glycol which are introduced into an effluent over a range of effluent temperatures and at an introduction rate of 300 ml/hr and an excess of oxygen of 3.0% by volume, can be plotted. The data which comprises the plots can then be compared to determine which treatment regimen should be effected according to this invention for the effluent condition existing at the injection location.

Figure 3D:
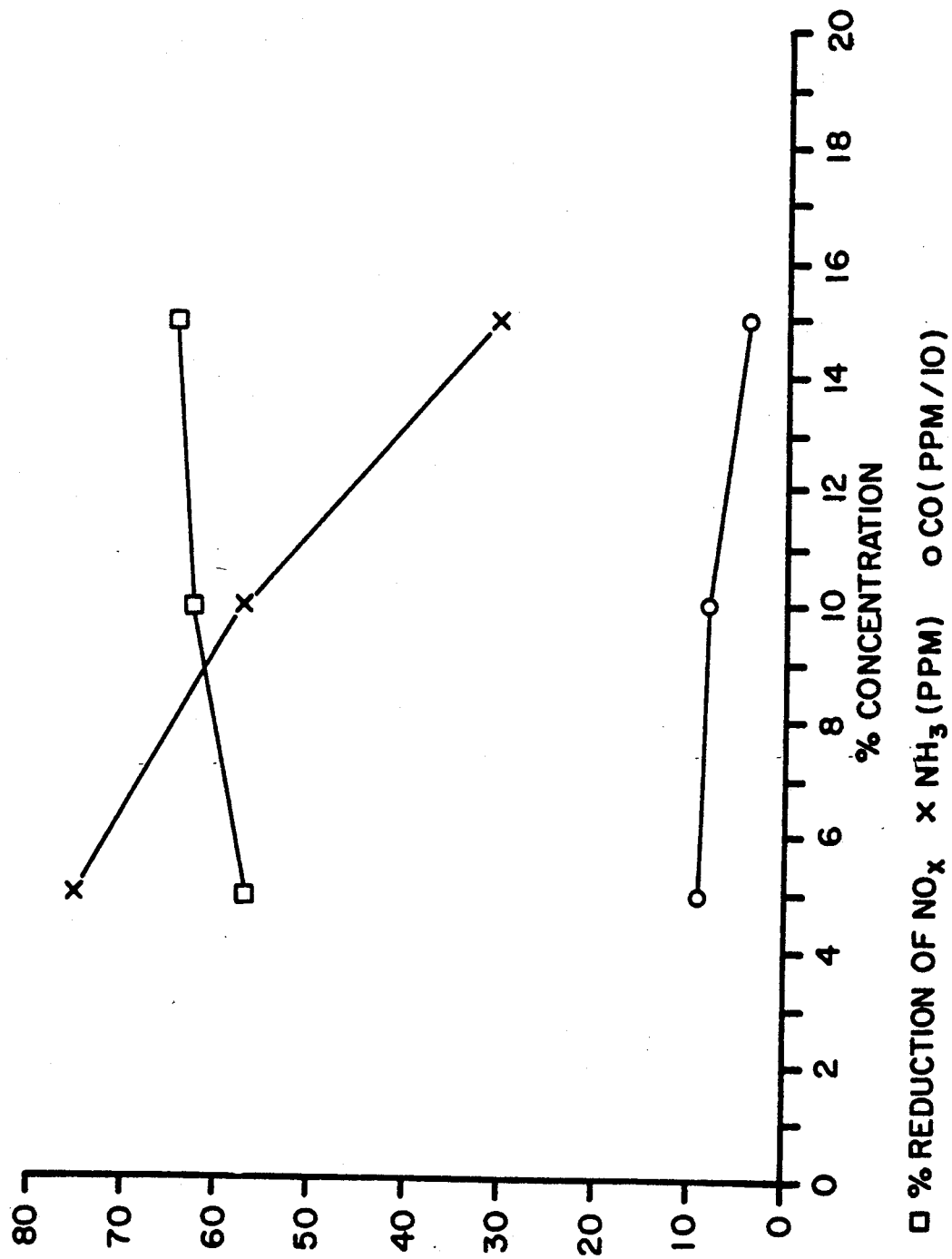
FIGS. 3d–f graphically represent the results of Examples IIIa, IIIb and IIIc presented as described below.
Figure 3E:
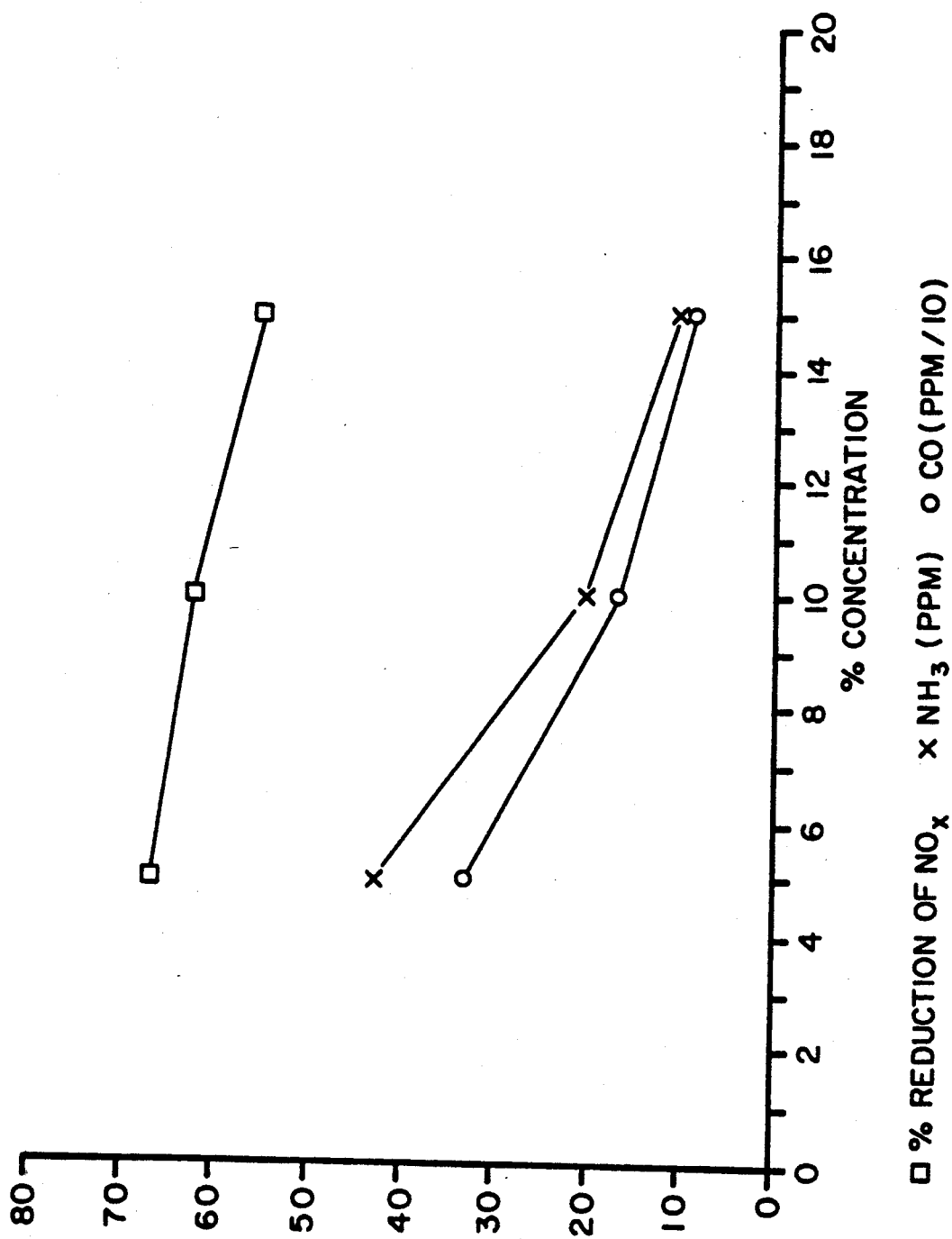
Figure 3F:
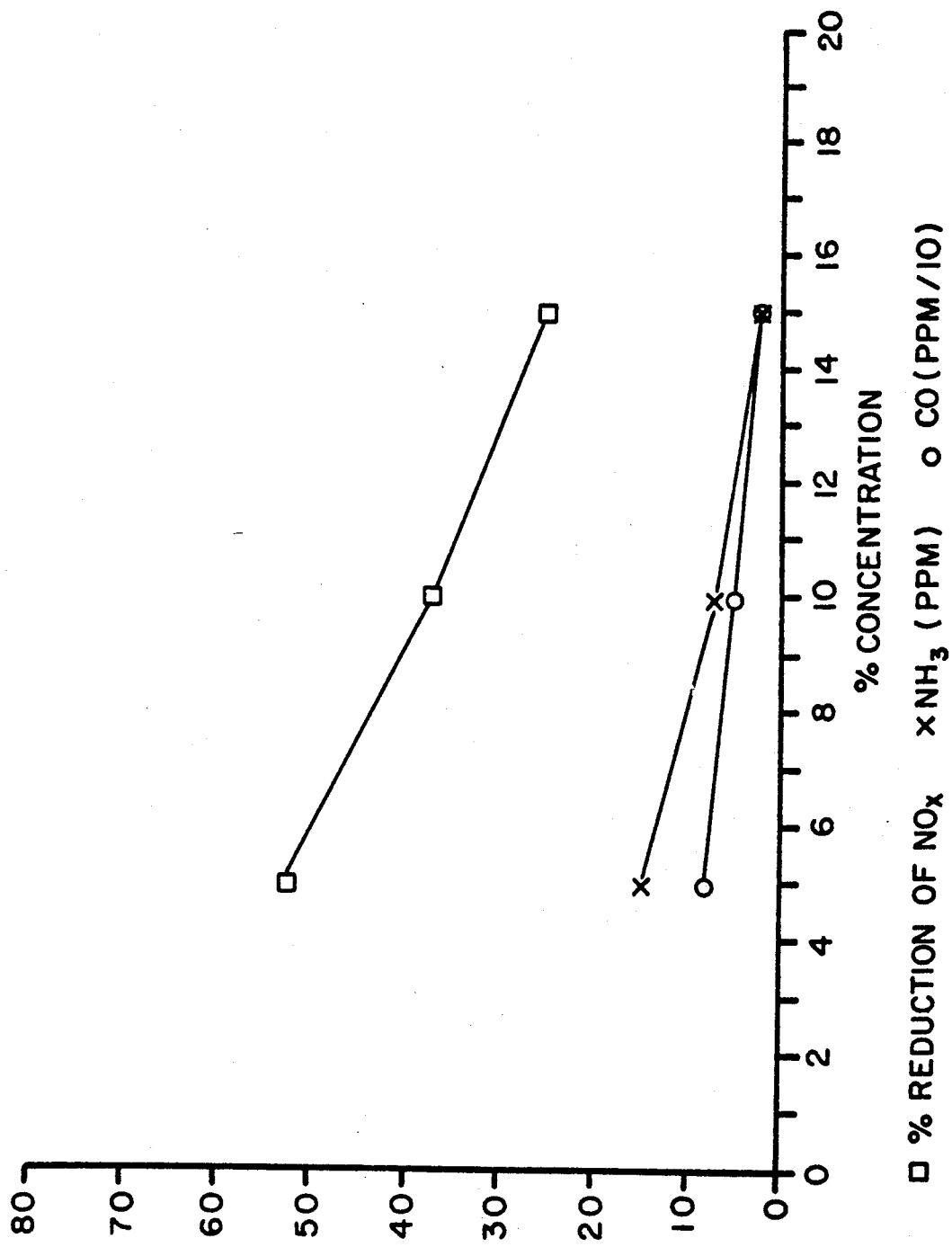

This is more clearly understood by reference to FIGS. 3d-3f, which graphically express the nitrogen oxides reduction, ammonia level and carbon monoxide level for each of the three treatment regimens represented by FIGS. 3a-3c, at three particular location of introduction effluent temperatures. If the effluent temperature at the introduction location is 1560° F., the desired treatment regimen, therefore, is the regimen which comprises the treatment agent having 15% ethylene glycol, as illustrated in FIG. 3d. If the effluent temperature at the introduction location is 1650° F., the desired treatment regimen, therefore, is the regimen which comprises the treatment agent having 10% ethylene glycol, as illustrated in FIG. 3e (the 15% ethylene glycol treatment regimen is not desired at 1650° F. because, although FIG. 3e indicates ammonia and carbon monoxide levels are low, $NO_x$ reduction is also lower than the maximum, indicating that the 15% ethylene glycol treatment regimen is operating on its nitrogen oxides reduction versus effluent temperature curve to the right and off the curve plateau) If the effluent temperature at the introduction location is 1755° F., the desired treatment regimen, therefore, is the regimen which comprises the treatment agent having 5% ethylene glycol, as illustrated in FIG. 3f, because both the 10% ethylene glycol and 15% ethylene glycol treatment regimens are operating to the right and off their curve plateau.

Another advantageous aspect of the present invention is in the situation where an effluent from the combustion of a carbonaceous fuel is required to have no more than a maximum level of another pollutant, such as ammonia and/or carbon monoxide The process of this invention can be used to achieve the maximum possible $NO_x$ reduction, or a target level of $NO_x$ reduction, while maintaining the level of such other pollutants under such maximum level.

One way this can be accomplished is using the normalized stoichiometric ratio (NSR) and/or weight ratio of the treatment regimen being effected. It will be recognized that as the NSR or weight ratio of a treatment regimen increases, the nitrogen oxides reduction elicited by that treatment regimen increases as does the production of other pollutants This fact can be utilized by effecting a treatment regimen at a relatively low NSR or weight ratio, for instance at an NSR of about 1.0 to about 1.5, and at the right side of the treatment regimen curve plateau (the treatment regimen can be effected at the right side of its curve plateau by any of the methods for effecting a treatment agent at the right side of its curve plateau discussed herein). The NSR or weight ratio of the treatment agent can then be increased (by increasing the introduction rate of the treatment agent) until the maximum level of other pollutant is reached. If there is more than one other pollutant which has a maximum level, the NSR or weight ratio is increased until the first of such other pollutants reaches its maximum level. In this way, the highest possible $NO_x$ reduction (or the desired target level of $NO_x$) can be achieved while maintaining the effluent in a condition which is below the maximum level for other pollutants.

For example, a treatment regimen which comprises an aqueous solution of 10% urea and 15% ethylene glycol introduced into an effluent at an introduction rate of 300 ml/hr. and an excess of oxygen of 3.0% has a nitrogen oxides reduction versus effluent temperature curve which is graphically reproduced as FIG. 3c, which graphically reproduces the results of Example IIIc. It will be observed by reference to FIG. 3c that this treatment regimen is operating towards the left side of its curve at an effluent temperature of 1555° F., in the midsection of its curve at an effluent temperature of 1625° F., and towards the right side of its curve at an effluent temperature of 1755° F.

Figure 4:
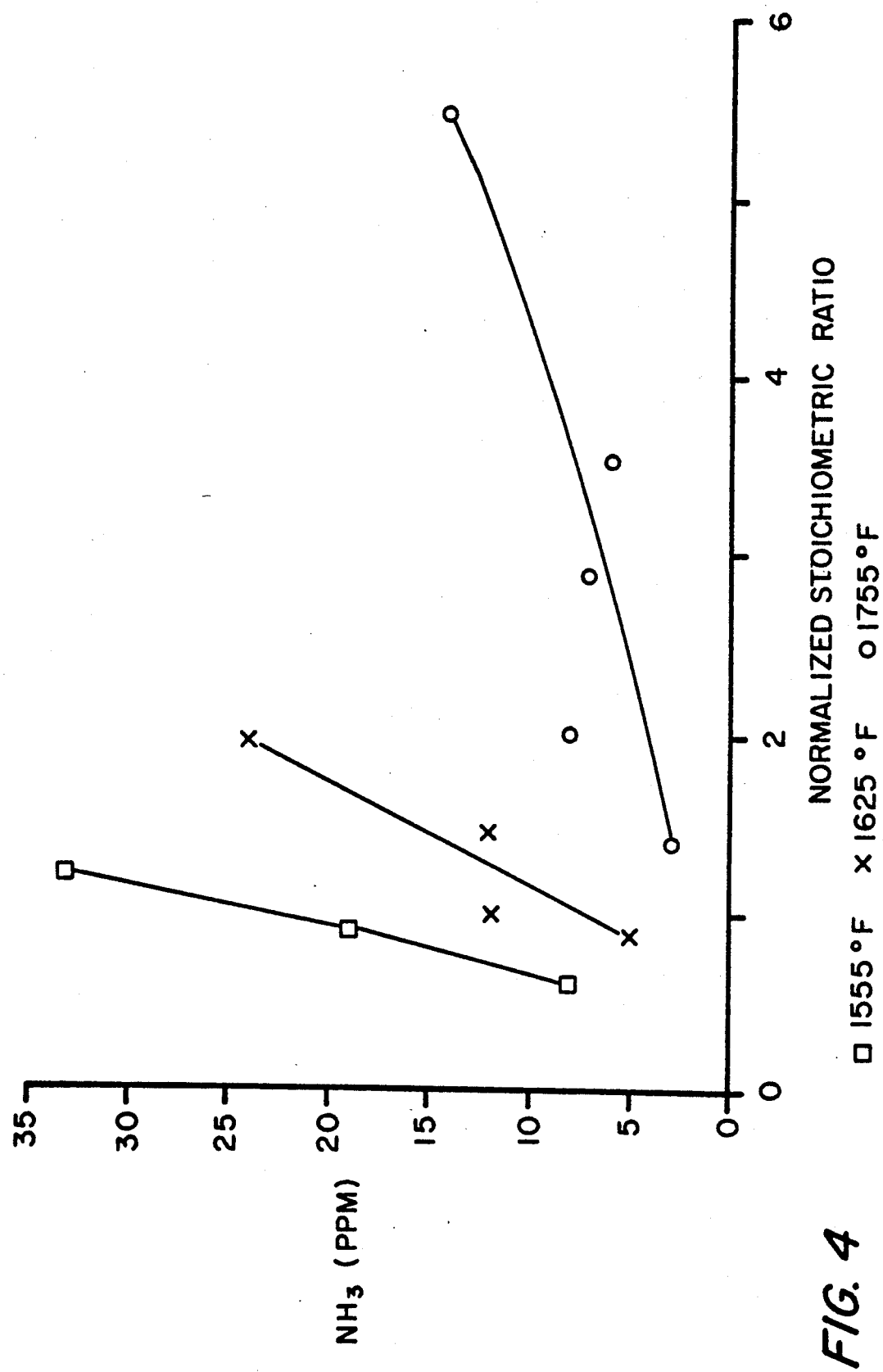
FIG. 4 graphically represents the results of Example IV.

Increasing the treatment regimen NSR at these three points produces markedly different results As illustrated in FIG. 4, which graphically reproduces the results of Example IV, increasing the NSR when the treatment regimen is towards the left side of its nitrogen oxides reduction versus effluent temperature curve results in a sharp increase in the amount of ammonia produced Increasing the NSR when the treatment regimen is in the midsection of the curve results also in a relatively sharp increase in the production of ammonia. Increasing the NSR when the treatment regimen is on the right side of its curve results in a gradual increase in the level of ammonia produced When the treatment regimen is effected on the right side of its curve, therefore, higher nitrogen oxides reductions can be much achieved before a maximum level of ammonia is reached.

As illustrated in FIG. 4, for a treatment regimen which comprises injecting a treatment agent of 10% urea and 15% ethylene glycol, if the maximum allowable level of ammonia is 15 parts per million (ppm), an NSR of 5.47 is achievable when the treatment regimen is effected on the right side of its curve, whereas NSRs of no more than about 1.5 are achievable when the treatment regimen is effected on the midsection or on the left side of the curve.

Similarly, when a target level of nitrogen oxides is desired, the NSR can be increased until the nitrogen oxides reduction is sufficient to attain that level of nitrogen oxides, provided that a maximum level of other pollutants is not surpassed. In this way, if the treatment regimen is operating on the right side of its curve plateau, the target level of $NO_x$ is attained while a minimum of other pollutants are produced.

In another advantageous aspect of this invention, the process of this invention can be used to reduce $NO_x$ levels to meet specified target levels while minimizing the production of other pollutants through "load following." "Load following" refers to a process which involves adjusting the treatment regimen which is being effected in response to the operating load at which the boiler is being fired When the boiler operating load changes, a change in effluent temperature occurs. Such a change in temperature of the effluent, it will be apparent, causes the point of operation on the nitrogen oxides reduction versus effluent temperature curve for the current treatment regimen to be translated either to the left, and hence away from minimization of other pollutants, or to the right, potentially off the curve plateau and onto the right side slope of the curve, and hence away from maximum nitrogen oxides reduction.

This can be accomplished by the use of an apparatus which comprises means for delivering and introducing a treatment agent in a boiler, such as an injector with chemical supply pump means connected therewith; detector means for detecting effluent levels of nitrogen oxides, oxygen, ammonia, carbon monoxide, sulfur trioxide, etc. as well as effluent temperature, such as effluent probes conventionally known; a control means for controlling delivery of specific chemical formulations in response to the effluent condition to achieve the desired results, i.e., maximimum nitrogen oxides reductions, or reductions to specific nitrogen oxides levels, and minimum presence of other pollutants, or maintainance of other pollutants below a specified level, such as conventionally known data processing equipment.

By replacing the current treatment regimen with a new treatment regimen, i.e., by adjusting one or more treatment regimen parameters such as dilution and introduction rate of the treatment agent, components of the treatment agent and relative presence of treatment agent components, the nitrogen oxides reduction versus effluent temperature curve is shifted (i.e., replaced with a new nitrogen oxides reduction versus effluent temperature curve) so that operation after the change is once again towards the right side of the curve plateau.

Furthermore, as discussed above, a change in boiler operating load leads to more than merely a change in effluent temperature. Frequently, a change in boiler load produces a change in the effluent with regard to $NO_x$ level. This becomes especially important when there is a maximum level of other pollutants which has to be met or a target level of nitrogen oxides reduction which has to be attained The change in $NO_x$ level can be measured directly or, preferably, can be determined using a load-dependent boiler characterization factor.

For a given boiler and fuel, the characterization factor relates the $NO_x$ level and temperature ofthe effluent at given locations to boiler load, and it is determined experimentally. With this information, the treatment regimen being effected at a given location can be adjusted immediately upon change of boiler operating load as measured by fuel supply rate, for example. As a result, when load is reduced, the treatment regimen feed rate is reduced to achieve the NSR or weight ratio needed to attain target reductions at that load and the treatment agent components are varied as necessary to respond to the temperature change resulting from the change in operating load. If the feed rate of the treatment regimen were not reduced, the NSR or weight ratio would be excessive in view of the lower level of $NO_x$ and excessive $NH_3$ and CO would be produced Similarly, when boiler operating load is increased, the feed rate of the treatment regimen is increased to achieve the NSR or weight ratio needed at that load. Otherwise, the NSR or weight ratio would be low and $NO_x$ reduction would be inadequate. Again, the components of the treatment agent are adjusted to compensate for the effluent temperature change associated with the change in boiler operating load.

This characterization factor is dependent on boiler configuration, boiler geometry, effluent constituents such as oxygen, ammonia and carbon monoxide, fuel type and boiler load and can be determined experimentally. Several other parameters such as number of burners in service affect the characterization factor, but those that are mentioned above are most important. By reference to the characterization factor for a given boiler and fuel, the nitrogen oxides level and temperature at a given location can be determined to a sufficient degree of certainty to permit the determination of how the treatment regimen should be adjusted to correct for translation on the nitrogen oxides reduction versus effluent temperature curve which occurs when the operating load is changed and for the change in NSR.

The preferred embodiment for maximizing nitrogen oxides reduction and controlling the production of other pollutants is by effecting a first treatment regimen which operates at the effluent temperatures currently existing on the right hand slope, off the curve plateau, of the treatment regimen's nitrogen oxides reduction versus effluent temperature curve. By knowledge of the effluent temperature and the curve for a plurality of treatment regimens, this can be simply accomplished using means described above Once done, the treatment regimen can be adjusted, by means which will be apparent to the skilled artisan upon reading this disclosure, to bring the operation thereof "up" and, advantageously but not necessarily, onto the curve plateau In other words, the curve can be shifted to do so. By this method, it can be assured that the treatment regimen being effected is operating as far to the right while still on or near its curve plateau as possible. The nitrogen oxides reduction is thus substantially maximized while the production of other pollutants is thus controlled.

Another surprising aspect of this invention is in the use of a treatment regimen as a probe for effluent conditions If the nitrogen oxides reduction versus effluent temperature curve (or, in fact, the ammonia or carbon monoxide production versus effluent temperature curves) for a treatment regimen is known, the effluent condition after that treatment regimen is effected will provide useful information about the effluent condition downstream from the location the treatment regimen is effected, it can even provide information on boiler operating load For instance, if the nitrogen oxides level is relatively low, but the level of production of other pollutants is relatively high, then it can be assumed that the treatment regimen is operating on the left side of its curve plateau. Using this information, the effluent temperature can be determined with a reasonable degree of accuracy and, using the boiler characterization factor described above, the boiler load can be determined. Similarly, if the $NO_x$ reduction is near but not at its maximum level, and ammonia and carbon monoxide levels are all low, it can be assumed that the treatment regimen is operating on the right side slope, off the curve plateau, of its curve. Effluent temperature and boiler operating load can then be determined therefrom. The more intimate familiarity with the treatment regimen's curve, the more accurate the determinations can be.

It will be understood that there are significant temperature variations at any given boiler location, associated with effluent flow patterns, boiler firing conditions, wall effects, etc. A regimen effected at a boiler location and tailored to operate on the right side of its nitrogen oxides reduction versus effluent temperature curve when exposed to the median effluent temperature at such location will probably operate on the left side in a low temperature area within the location. The low temperature areas will result in production of ammonia and/or carbon monoxide, as apparent from a review of this disclosure. This effect can be minimized by minimizing treatment of the low temperature areas, such as by use of suitable injectors (familiar to the skilled artisan), by tailoring the treatment regimen to the low temperature areas, or by a multiple injection system utilizing both methods.

It will further be understood that although operation on a nitrogen oxides reduction versus effluent temperature curve plateau is preferred, in some situations operating on the right side slope, off the plateau, can be desired, in order to maintain the production of other pollutants at a low level while still achieving significant reduction of nitrogen oxides.

It will also be recognized by the skilled artisan that the process of the present invention can be combined with a $NO_x$ reducing process which utilizes selective catalytic reduction ("SCR") to reduce nitrogen oxides. Such an SCR process utilizes compounds of catalytic materials such as oxides or iron, vanadium and activated carbon to reduce the $NO_x$ content of effluents In fact, the SCR treatment can be used as an additional stage in the process of this invention. To do so, the process disclosed herein is practiced to reduce the nitrogen oxides concentration in the effluent and also to adjust the ammonia remaining in the effluent to approximately a 1:1 ratio of ammonia to the nitrogen oxides remaining in the effluent by means achievable by the practice of the present invention, and then scrubbing the effluent with SCR to reduce the effluent $NO_x$ levels even further In this way, the most advantageous aspects of both the non-catalytic, free radical reduction of nitrogen oxides disclosed herein and SCR can both be obtained, resulting in extremely high $NO_x$ reductions without significant amounts of other pollutants such as NH3 or CO remaining in the effluent.

The following examples further illustrate and explain the invention by detailing the operation of a treatment regimen using "right side of the curve" methods.

EXAMPLE I

The burner used is a burner having an effluent flue conduit, known as a combustion tunnel, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxides, sulfur oxides, ammonia, carbon monoxide, carbon dioxide, percent excess oxygen and other compounds of nterest which may be present in the effluent The effluent flue conduit additionally has thermocouple ports for temperature measurement at various locations. The temperature of the effluent into which the treatment agents are injected is measured at the location of injection utilizing a K-type thermocouple. Atomizing injectors described in copending U.S. patent application entitled "Process and Apparatus for Reducing the Concentration of Pollutants in an Effluent" having Ser. No. 009,696, filed in the name of Burton on Feb. 2, 1987, the disclosure of which is incorporated herein by reference, are positioned through ports in the effluent flue conduit in order to introduce and distribute the treatment agents into the effluent stream. The agents are injected into the effluent at a rate of 300 ml/hr. The burner fuel is a Number 2 fuel oil, and the burner is fired at a rate of 9.6 lbs/hr with an excess of oxygen of 3.0% by volume.

A baseline nitrogen oxides concentration reading is taken prior to beginning each run to calculate the injection ratio of treatment agent to baselin nitrogen oxides and the NSR, and a final nitrogen oxides reading is taken during and downstream from injection of the treatment agetns to calculate the reduction in the nitrogen oxides concentration in the effluent elicited by ech of the treatment agents injected. Moreover, an ammonia and carbox monoxide reading is taken during and downstream from injection of the treatment agents to calculate the production of other pollutants.

Aqueous solutions comprising 10% by weight of urea, 4% by weight of hexamethylenetetramine, 10% by weight of furfural and 0.1% by weight of a commerically available surfactant are injected into the effluent at the indicated temperatures. The results are set out in Table 1 and reproduced graphically in FIGS. 1 and 1a.

TABLE 1

| Temp. (°F.) | NOx (ppm) Baseline | NOx (ppm) Final | % Red. | NH3 (ppm) | CO (ppm) |
|---|---|---|---|---|---|
| 1400 | 177 | 96 | 45.8 | 48 | 275 |
| 1530 | 180 | 78 | 56.7 | 38 | 110 |
| 1620 | 185 | 80 | 56.8 | 18 | 20 |
| 1680 | 190 | 80 | 57.9 | 8 | 15 |
| 1730 | 195 | 100 | 48.7 | 10 | 8 |
| 1800 | 202 | 113 | 44.1 | 6.5 | 5 |

EXAMPLE IIa

The procedure followed is that of Example I except that the boiler is fired at a rate of 9.6 lbs/hr to 12.0 lbs/hr to achieve the effluent temperatures.

The treatment agent injected is an aqueous solution which comprises 10% by weight of urea, 15% by weight of furfural, and 0.1% by weight of a commercially available surfactant. The injection temperature, % excess oxygen, NSR, baseline NOx, final NOx and % reduction of NOx for each run is set out in Table 2a and reproduced graphically in FIG. 2.

TABLE 2a

| Run | Temp. °F. | O2% | NSR | Baseline | Final | % Red. |
|---|---|---|---|---|---|---|
| 1 | 1400 | 3.1 | 1.83 | 195 | 137 | 29.7 |
| 2 | 1470 | 3.0 | 1.73 | 208 | 85 | 59.1 |
| 3 | 1510 | 3.0 | 2.11 | 170 | 71 | 58.2 |
| 4 | 1565 | 3.0 | 2.11 | 170 | 74 | 56.5 |
| 5 | 1615 | 3.0 | 2.11 | 170 | 80 | 52.9 |
| 6 | 1665 | 3.0 | 2.11 | 170 | 82 | 51.8 |
| 7 | 1690 | 3.0 | 2.11 | 170 | 86 | 49.4 |
| 8 | 1715 | 3.0 | 2.08 | 173 | 88 | 49.1 |
| 9 | 1755 | 3.1 | 2.06 | 145 | 70 | 51.7 |
| 10 | 1825 | 3.1 | 2.06 | 145 | 78 | 46.2 |
| 11 | 1875 | 3.0 | 2.07 | 145 | 110 | 24.1 |
| 12 | 1910 | 3.0 | 1.97 | 152 | 137 | 9.9 |
| 13 | 1940 | 3.0 | 1.97 | 152 | 203 | −33.6 |

EXAMPLE IIb

The procedure of Example IIa is repeated except that the treatment agent which is injected is an aqueous solution comprising 10% by weight of urea and 0.1% by weight of a commercially available surfactant. The results are set out in Table 2b and reproduced graphically in FIG. 2.

TABLE 2b

| Run | Temp. °F. | O2% | NSR | Baseline | Final | % Red. |
|---|---|---|---|---|---|---|
| 1 | 1660 | 3.2 | 2.22 | 166 | 145 | 12.7 |
| 2 | 1695 | 3.0 | 1.54 | 167 | 73 | 56.3 |
| 3 | 1750 | 3.0 | 1.92 | 150 | 70 | 53.3 |
| 4 | 1800 | 3.0 | 1.89 | 152 | 60 | 60.5 |
| 5 | 1850 | 3.0 | 1.85 | 155 | 68 | 56.1 |
| 6 | 1950 | 3.0 | 1.85 | 155 | 96 | 38.1 |
| 7 | 1980 | 3.0 | 1.81 | 159 | 107 | 32.7 |

EXAMPLE IIc

The procedure of Example IIa is repeated except that the treatment agent injected is an aqueous solution comprising 10% by weight of urea, 15% by weight of ethylene glycol and 0.1% by weight of a commercially available surfactant. The results are set out in Table 2c and reproduced graphically in FIG. 2.

TABLE 2c

| Run | Temp. °F. | O2% | NSR | Baseline | Final | % Red. |
|---|---|---|---|---|---|---|
| 1 | 1450 | 7.0 | 1.69 | 145 | 125 | 13.8 |
| 2 | 1515 | 3.1 | 1.76 | 178 | 98 | 44.9 |
| 3 | 1555 | 3.2 | 1.79 | 174 | 62 | 64.4 |
| 4 | 1650 | 3.0 | 1.91 | 165 | 70 | 57.6 |
| 5 | 1710 | 3.0 | 1.53 | 167 | 85 | 49.1 |
| 6 | 1720 | 3.0 | 1.45 | 167 | 112 | 32.9 |

EXAMPLE IIIa

The procedure of example I is followed except that the boiler is fired at a rate of 9.6 lbs/hr. to 10.8 lbs/hr. The treatment agent injected comprises an aqueous solution of 10% by weight of urea, 5% by weight of ethylene glycol and 0.1% by weight of a commercially available surfactant. The results are set out in Table 3a and reproduced graphically in FIG. 3a.

TABLE 3a

| Temp. (°F.) | NOₓ (ppm) Baseline | NOₓ (ppm) Final | % Red. | NH₃ (ppm) | CO (ppm) |
| --- | --- | --- | --- | --- | --- |
| 1460 | 164 | 100 | 39.0 | 77 | 117 |
| 1560 | 164 | 71 | 56.7 | 75 | 84 |
| 1600 | 167 | 62 | 62.9 | 60 | 54 |
| 1650 | 170 | 57 | 66.5 | 43 | 33 |
| 1700 | 177 | 61 | 65.5 | 28 | 17 |
| 1750 | 167 | 80 | 52.1 | 15 | 8 |
| 1800 | 162 | 103 | 36.4 | 6 | 3 |
| 1825 | 160 | 116 | 27.5 | 3 | 2 |

EXAMPLE IIIb

The procedure of Example IIIa is followed except that the treatment agent injected comprises an aqueous solution of 10% by weight of urea, 10% by weight of ethylene glycol and 0.1% by weight of a commercially available surfactant. The results are set out in Table 3b and reproduced graphically in FIG. 3b.

TABLE 3b

| Temp. (°F.) | NOₓ (ppm) Baseline | NOₓ (ppm) Final | % Red. | NH₃ (ppm) | CO (ppm) |
| --- | --- | --- | --- | --- | --- |
| 1400 | 193 | 138 | 28.5 | 95 | 265 |
| 1465 | 193 | 117 | 39.4 | 87 | 245 |
| 1560 | 193 | 73 | 62.2 | 57 | 76 |
| 1600 | 195 | 67 | 65.6 | 38 | 33 |
| 1650 | 197 | 75 | 61.9 | 20 | 17 |
| 1700 | 198 | 87 | 56.1 | 23 | 14 |
| 1760 | 177 | 112 | 36.7 | 7 | 5 |
| 1800 | 177 | 130 | 26.6 | 3 | 3 |

EXAMPLE IIIc

The procedure of Example IIIb is followed except that the treatment agent injected comprises an aqueous solution of 10% by weight of urea, 15% by weight of ethylene glycol and 0.1% by weight of a commercially available surfactant. The results are set out in Table 3c and graphically reproduced in FIG. 3c.

TABLE 3c

| Temp. (°F.) | NOₓ (ppm) Baseline | NOₓ (ppm) Final | % Red. | NH₃ (ppm) | CO (ppm) |
| --- | --- | --- | --- | --- | --- |
| 1460 | 186 | 85 | 54.3 | 70 | 277 |
| 1560 | 186 | 67 | 64.0 | 30 | 33 |
| 1600 | 186 | 66 | 64.5 | 20 | 18 |
| 1650 | 183 | 83 | 54.6 | 1 | 9 |
| 1700 | 184 | 98 | 46.7 | 6 | 6 |
| 1750 | 186 | 140 | 24.7 | 2 | 2 |

EXAMPLE IV

A treatment agent comprising an aqueous solution of 10% by weight of urea, 15% by weight of ethylene glycol and 0.1% by weight of a commercially available surfactant is injected into the effluent combustion tunnel described in Example I at a range of NSRs and the production of ammonia measured. The normalized stoichiometric ratio (NSR) for each injection and the results are set out in Table 4 and graphically reproduced in FIG. 4. For convenience, the temperatures indicated in FIG. 4 represent the approximate average of the temperatures of each data point for the respective curve.

TABLE 4

| Temp. (°F.) | NSR | NH₃ (ppm) |
| --- | --- | --- |
| 1560 | .61 | 8 |
| 1555 | .90 | 19 |
| 1550 | 1.20 | 33 |
| 1620 | .87 | 5 |
| 1620 | .99 | 12 |
| 1630 | 1.46 | 12 |
| 1625 | 1.95 | 24 |
| 1715 | 1.41 | 3 |
| 1720 | 2.01 | 8 |
| 1730 | 2.87 | 7 |
| 1780 | 3.52 | 6 |
| 1775 | 5.47 | 14 |

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:
1. A process for reducing the concentration of nitrogen oxides in an effluent from the combustion of a carbonaceous fuel while minimizing the production of other pollutants, the process comprising:
   a. determining the effluent conditions existing at a location for intrduction of a treatment agent;
   b. effecting a treatment regimen which comprises introducing a treatment agent selected from the group consisting of urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea and mixtures thereof into the effluent to treat the effluent under introduction conditions effective to reduce the nitrogen oxides concentration in the effluent under said determined effluent conditions while minimizing the production of other pollutants;
   c. monitoring the condition of the effluent until a significant alteration in the condition of the effluent is observed;
   c. adjusting said treatment regimen by varying at least one of the following parameters
      (i) dilution and introduction rate of said treatment agent;
      (ii) components of said treatment agent; and
      (iii) relative presence of treatment agent components,
      to effect an adjusted treatment regimen, wherein said adjusted treatment regimen operates under conditions effective to reduce the nitrogen oxides concentration in the effluent under said altered effluent condition while minimizing the production of othe pollutants.

2. The process of claim 1/ wherein said oxygenated hydrocarbon is selected from the group consisting of furfural, acetone, sugar, an alcohol, a lignin derivatives, a carboxylic acid, a peroxide, an aldehyde, an ether, an ester, a ketone, glycerin, tetrahydrofuran, acetone, $NH_4$-lignosulfonate, calcium lignosulfonate, 1,3 dioxolane, 1,4 dioxane, tetrahydrofuran, furfurylamine, n-butyl acetate, methylal, furan, fish oil, furfuryl acetate, tetrahydrofuran tetrahydrofurylamine, tetrahydropyran, mannitol, hexamethylenediamine and acetic anhydride.

3. The process of claim 2 wherein said sugar is selected from the group consisting of sucrose, d-galactose and molasses.

4. The process of claim 2 wherein said carboxylic acid is selected from the group consisting of coumalic acid, gluconic acid, 2-furoic acid, citric acid, formic acid, barbituric acid, 2,3,4,5-tetracarboxylic acid, furylacrylic acid, oxalic acid and mucic acid.

5. The process of claim 2 wherein said alcohol is selected from the group consisting of ethylene glycol, furfurylalcohol, 1,3 butylene glycol, tetrahydrofuryl alcohol, 2,5-furandimethanol and methanol.

6. The process of claim 1 wherein said hydroxy amino hydrocarbon is selected from the group consisting of alkanolamines, amino acids and protein-containing compositions.

7. The process of claim 1 wherein said five or six membered heterocyclic hydrocarbon having at least one cyclic nitrogen is selected from the group consisting of piperazine, piperidine, pyridine, pyrazine, pyrazole, imidazole, oxazolidone, pyrrole, pyrrolidine, and mixtures thereof.

8. The process of claim 1 wherein said ammonium salt of an organic acid having a carbon to nitrogen ratio of grea,ter than 1:1 is selected from the group consisting of ammonium acetate, ammonium and diammonium adipate, ammonium benzoate, ammonium binoxalate, ammonium caprylate, ammonium, diammonium and triammonium citrate, ammonium crotonate, ammonium and diammonium dodecanoate, ammonium and diammonium fumarate, ammonium heptanoate, ammonium linolenate ammonium and diammonium malate, ammonium mono butyrate, ammonium oleate, ammonium and diammonium pthalate, ammonium propionate, ammonium salicylate, ammonium and diammonium succinate ammonium and diammonium tartarate, and ammonium, diammonium and triammonium trimellitate.

9. The process of claim 1 wherein said treatment agent is selected from the group consisting of monoethanolamine, amino acetic acid, monomethylamine, triethylene tetramine, hexamethylenediamine, tetraethylene pentamine, bis-hexamethylene triamine, polyamine HpA, 1,2-diaminopropane, N,N-dimethylethylenediamine, tetramethylethylenediamine, 2-methylaziridine, bis (3-aminopropyl) ethylenediamine, tetramethyldiaminomethane, ethylenediamine and diethylenetriamine.

10. The process of claim 1 wherein the monitored condition of the effluent is selected from the group consisting of boiler operating load, effluent temperature at the location where said treatment agent is introduced, nitrogen oxides level, ammonia level, carbon monoxide level, excess oxygen level and mixtures thereof.

11. The process of claim 1, wherein said monitored effluent condition is selected from the group consisting of nitrogen oxides level and effluent temperature at the location where said treatment agent is introduced.

12. The process of claim which further comprises increasing the introduction rate of said treatment agent to increase the normalized stoichiometric ratio until a predetermined maximum level of other pollutants is substantially attained but not surpassed.

13. The process of claim 1 which further comprises increasing the introduction rate of said treatment agent to increase the normalized stoichiometric ratio until a predetermined target level of nitrogen oxides reduction is substantially attained provided that a predetermined maximum level of other pollutants is not surpassed.

14. A process for reducing the concentration of nitrogen oxides in an effluent from the combustion of a carbonaceous fuel while minimizing the production of other pollutants, the process comprising:

a. determining the nitrogen oxides reduction versus effluent temperature curve for each of a plurality of treatment regimens each of which comprises introducing into the effluent a treatment agent comprising urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1,-azobisformamide, methylol urea, methylol urea-urea condensation product, dimethylol urea, methyl urea, dimethyl urea and mixtures thereof;

b. ascertaining which treatment regimen which, when effected to treat an effluent at the effluent temperature existing at the location for injection, acts within its curve plateau at the point furthest to the right; and c. effecting said ascertained treatment regimen to treat the effluent under conditions effective to reduce the nitrogen oxides concentration of the effluent while substantially avoiding the production of other pollutants.

15. The process of claim 14 which further comprises increasing the introduction rate of said treatment agent to increase the normalized stoichiometric ratio until a predetermined maximum level of other pollutants is substantially attained but not surpassed.

16. The process of claim 14 which further comprises increasing the introduction rate of said treatment agent to increase the normalized stoichiometric ratio until a predetermined target level of nitrogen oxides reduction is substantially attained provided that a predetermined maximum level of other pollutants is not surpassed.

17. A process for the reduction of the concentration of nitrogen oxides in an effluent from the combustion of a carbonaceous fuel while minimizing the production of other pollutants, the process comprising introducing a treatment agent which comprises urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1′-azobisformamide, methylol urea, methylol urea-urea condensation product, dimethylol urea, methyl urea, dimethyl urea and mixtures thereof having a known nitrogen oxides reduction versus effluent temperature curve having a recognizable plateau into the effluent under conditions effective to reduce the concentration of nitrogen oxides in the effluent through a reaction or series of reactions facilitated by said treatment agent and adjusting the introduction position to thereby cause said introduction to be performed at a different effluent temperature to drive said reaction or series of reactions towards the right side of the plateau of said nitrogen oxides reduction versus effluent temperature curve.

18. A process for reducing the concentration of nitrogen oxides in an effluent from the combustion of a carbonaceous fuel while minimizing the production of other pollutants, the process comprising:
   a. determining the condition of the effluent which exists at a location for introduction;
   b. introducing a treatment agent which comprises urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1′-azobisformamide, methylol urea, methylol urea-urea condensation product, dimethylol urea, methyl urea, dimethyl urea and mixtures thereof having a known nitrogen oxides reduction versus effluent temperature curve having a recognizable plateau into the effluent, which treatment agent is effective to reduce the nitrogen oxides concentration of the effluent at the determined effluent conditions through a reaction or series of reactions facilitated by said treatment agent;
   c. adjusting the components, dilution/introduction rate or relative presence of components of said treatment agent to shift said curve and thereby cause the introduction of said treatment agent to operate on the right said of the plateau of said shifted nitrogen oxides reduction versus effluent temperatre curve.

19. The process of claim 18 which further comprises increasing the introduction rate of said treatment agent to increase the normalized stoichiometric ratio until a predetermined maximum level of other pollutants is substantially attained but not surpassed.

20. The process of claim 18 which further comprises increasing the introduction rate of said treatment agent to increase the normalized stoichiometric ratio until a predetermined target level of nitrogen oxides reduction is substantially attained provided that a predetermined maximum level of other pollutants is not surpassed.

21. A process for reducing the concentration of nitrogen oxides in an effluent from the combustion of a carbonaceous fuel while minimizing the production of other pollutants, the process comprising:
   a. introducing a treatment agent which comprises urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1′-azobisformamide, methylol urea, methylol urea-urea condensation product, dimethylol urea, methyl urea, dimethyl urea and mixtures thereof into the effluent under conditions effective to reduce the concentration of nitrogen oxides in the effluent through a reaction or series of reactions facilitated by said treatment agent; and
   b. varying at least one of the following parameters
      (i) dilution and introduction rate of said treatment agent;
      (ii) components of said treatment agent;
      (iii) relative presence of treatment agent components; and
      (iv) introduction position, wherein said reaction or series of reactions are driven towards a reduction of the production of other pollutants while substantially maintaining the level of nitrogen oxides reduction.

22. The process of claim 22 which further comprises increasing the introduction rate of said treatment agent to increase the normalized stoichiometric ratio until a predetermined maximum level of other pollutants is substantially attained but not surpassed.

23. The process of claim 21 which further comprises increasing the introduction rate of said treatment agent to increase the normalized stoichiometric ratio until a predetermined target level of nitrogen oxides reduction is substantially attained provided that a predetermined maximum level of other pollutants is not surpassed.

24. A process for reducing the concentration of nitrogen oxides in an effluent from the combustion of a carbonaceous fuel while minimizing the production of other pollutants, the process comprising:
   a. effecting a first treatment regimen which comprises introducing a treatment agent comprising urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1′-azobisformamide, methylol urea, methylol urea-urea condensation product, dimethylol urea, methyl urea, dimethyl urea and mixtures thereof into the effluent to treat the effluent under conditions effective to reduce the nitrogen oxides concentration in the effluent through a reaction or series of reactions facilitated by said first treatment regimen;
   b. determining the position on the nitrogen oxides reduction versus effluent temperature curve for said treatment agent at which said first treatment regimen is being effected;

c. adjusting said first treatment regimen by varying at least one of the following parameters
   (i) dilution and introduction rate of said treatment agent;
   (ii) components of said treatment agent; and
   (iii) relative presence of treatment agent components,
   to effect a second treatment regimen; and
(d) determining the location on the nitrogen oxides reduction versus effluent temperature curve for said second treatment regimen at which said second treatment regimen being effected, wherein the location at which said second treatment regimen is being effected is further to the right on its nitrogen oxides reduction versus effluent temperature curve than the location at which said first treatment regimen is being effected on its nitrogen oxides reduction versus effluent temperature curve.

25. The process of claim 24 which further comprises repeating steps c and d until a predetermined maximum level of the presence of other pollutants is substantially attained but not surpassed.

26. The process of claim 24 which further comprises increasing the introduction rate of said treatment agent to increase the normalized stoichiometric ratio until a predetermined maximum level of other pollutants is substantially attained but not surpassed.

27. The process of claim 24, which further comprises increasing the introduction rate of said treatment agent to increase th normalized stoichiometric ratio until a predetermined target level of nitrogen oxides reduction is substantially attained provided that a predetermined maximum level of other pollutants is not surpassed.

28. A process for reducing the concentration of nitrogen oxides in an effluent from the combustion of a carbonaceous fuel while minimizing the production of other pollutants, the process comprising
   a. effecting a first treatment regimen which comprises introducing a treatment agent comprising urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea and mixtures thereof into the effluent to treat the effluent under conditions effective to reduce the nitrogen oxides concentration in the effluent through a reaction or series of reactions facilitated by said first treatment regimen;
   b. determining the position on the nitrogen oxides reduction versus effluent temperature curve for said treatment agent at which said first treatment regimen is being effected;
   c. adjusting said first treatment regimen by varying at least one of the following parameters
      (i) dilution and introduction rate of said treatment agent;
      (ii) components of said treatment agent; and
      (iii) relative presence of treatment agent components,
      to effect a second treatment regimen; and
   (d) determining the location on the nitrogen oxides reduction versus effluent temperature curve for said second treatment regimen at which said second treatment regimen being effected, wherein the location at which said second treatment regimen is being effected is further to the left in its nitrogen oxides reduction versus effluent temperature curve than the location at which said first treatment regimen is being effected on its nitrogen oxides reduction versus effluent temperature curve.

29. The process of claim 28 which further comprises repeating steps c and d until a predetermined maximum level of the presence of other pollutants is substantially attained but not surpassed.

30. The process of claim 28 which further comprises increasing the introduction rate of said treatment agent to increase the normalized stoichiometric ratio until a predetermined maximum level of other pollutants is substantially attained but not surpassed.

31. The process of claim 28 which further comprises increasing the introduction rate of said treatment agent to increase the normalized stoichiometric ratio until a predetermined target level of nitrogen oxides reduction is substantially attained provided that a predetermined maximum level of other pollutants is not surpassed.

32. A process for reducing the concentration of nitrogen oxides in an effluent from the combustion of a carbonaceous fuel while minimizing the production of other pollutants, the process comprising:
   a. introducing a treatment agent which comprises urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1,-azobisformamide, methylol urea, methylol urea-urca oondensation product, dimethylol urea, methyl urea, dimethyl urea and mixtures thereof into the effluent under conditions effective to reduce the concentration of nitrogen oxides in the effluent through a reaction or series of reactions facilitated by said treatment agent; and
   b. varying at least one of the following parameters
      (i) dilution and introduction rate of said treatment agent;
      (ii) components of said treatment agent;
      (iii) relative presenceof treatment agent components; and
      (iv) position at which introduction of said treatment agent occurs,
      wherein said reaction or series of reactions are driven towards a reduction of the production of other pollutants while substantially maintaining the level of nitrogen oxides reduction.

33. A process for reducing the concentration of nitrogen oxides in an effluent from the combustion of a carbonaceous fuel while minimizing the production of other pollutants, the process comprising:
   a. effecting a treatment regimen which comprises introducing a treatment agent comprising urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea and mixtures thereof into the effluent under conditions effective to reduce the nitrogen oxides concentration in the effluent while minimizing the production of other pollutants at the boiler load currently in operation;
   b. monitoring the boiler load, level of nitrogen oxides or level of other pollutants until a significant change in boiler load is observed;
   c. adjusting said treatment regimen by varying at least one of the following parameters
      (i) dilution and introduction rate of said treatment agent;
      (ii) components of said treatment agent;
      (iii) relative presence of treatment agent components; and
      (v) normalized stoichiometric ratio, to effect an adjusted treatment regimen, wherein said adjusted treatment regimen operates under conditions effective to reduce the nitrogen oxides concentration in the effluent while minimizing the production of other pollutants.

34. The process of claim 33 wherein said treatment regimen is adjusted by reference to a load-dependent boiler characterization factor.

35. The process of claim 33 which further comprises increasing the introduction rate of said treatment agent to increase the normalized stoichiometric ratio until a predetermined maximum level of other pollutants is substantially attained but not surpassed.

36. The process of claim 33 which further comprises increasing the introduction rate of said treatment agent to increase the normalized stoichiometric ratio until a predetermined target level of nitrogen oxides reduction is substantially attained provided that a predetermined maximum level of other pollutants is not surpassed.

37. A process for reducing the concentration of nitrogen oxides in an effluent from the combustion of a carbonaceous fuel while minimizing the production of other pollutants, the process comprising:
   a. introducing a treatment agent which comprises urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea and mixtures thereof having a nitrogen oxides reduction versus effluent temperature curve having a recognizable plateau into an effluent from the combustion of a carbonaceous fuel, which treatment agent is effective to reduce the nitrogen oxides concentration of the effluent at the determined effluent conditions through a reaction or series of reactions facilitated by said treatment agent and wherein said treatment agent is introduced under conditions such that the injection acts within the nitrogen oxides reduction versus effluent temperature curve at a position on the curve to the right of the curve plateau;
   b. adjusting the components, dilution/ introduction rate or relative presence of components of said, treatment agent to shift said curve and thereby cause the introduction of said treatment agent to operate towards the curve plateau of the shifted nitrogen oxides reduction versus effluent temperature curve.

38. The process of claim 37 wherein step b is repeated unlil the injection acts on the curve plateau of the shifted nitrogen oxides reduction versus effluent temperature curve.

39. A process for ascertaining the condition of an effluent from the combustion of a carbonaceous fuel, the process comprising effecting a treatment regimen having a known nitrogen oxides reduction versus effluent temperature curve by introducing a treatment agent which comprises urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea and mixtures thereof into the effluent under conditions effective to reduce the nitrogeh oxides concentration in the effluent; determining the nitrogen oxides, ammonia and carbon monoxide concentration of the effluent during and downstream from the introduction of said treatment agent; and ascertaining the condition of the effluent by relating the nitrogen oxides, ammonia and carbon monoxide concentration to the nitrogen oxides reduction versus effluent temperature curve for the effected treatment regimen.

40. The process of claim 39 wherein the boiler operating load is ascertained from the condition of the effluent by further reference to a load dependent boiler characterization factor.

41. A process for reducing the concentration of nitrogen oxides in an effluent from the combustion of a carbonaceous fuel while minimizing the production of other pollutants, the process comprising:
   a. introducing a treatment agent which comprises urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea and mixtures thereof having a nitrogen oxides reduction versus effluent temperature curve having a recognizable plateau into an effluent from the combustion of a carbonaceous fuel, which treatment agent is effective to reduce the nitrogen oxides concentration of the effluent at the determined effluent conditions through a reaction or series of reactions facilitated by said treatment agent and wherein said treatment agent is introduced under conditions such that the injection acts within the nitrogen oxides reduction versus effluent temperature curve at a position on the curve to the right of the curve plateau;

b. adjusting the components, dilution/introduction rate or relative presence of components of siid treatment agent to shift said curve and thereby cause the introduction of said treatment agent to creat a ratio of ammonia in the effluent to nitrogen oxides in the effluent of approximately 1:1.

42. The process of claim 41 which further comprises scrubbing the effluent utilizing the process of selective catalytic reduction.

* * * * *

UNITED STATES PATENT AND TRADEMARK OFFICE
CERTIFICATE OF CORRECTION

PATENT NO. : 5,017,347  
DATED : May 21, 1991  
INVENTOR(S) : William Robert Epperly, et al.

Page 1 of 2

It is certified that error appears in the above-indentified patent and that said Letters Patent is hereby corrected as shown below:

At column 1, lines 16, 35, and 47, "1987now" should read --1987, now --.

At column 1, line 47, "4,803,839" should read --4,830,839--.

At column 5, line 12, "reters" should read --refers--.

At column 11, line 17, "treatx:ent" should read --treatment--.

At column 11, line 32, "0%" should read --10%--.

At column 19, line 51, "1" should read --10--.

Column 20:
At claim 1, line 6, "intrduction" should read --introduction--.

At claim 1, line 32, "c." should read --d.--.

Column 21:
At claim 8, line 3, "grea,ter" should read --greater--.

At claim 11, line 1, "1" should read --10--.

Column
At claim 12, line 1, "claim which" should read --claim 1 which--.

Column 23:
At claim 18, line 34, "said" should read --side--.

Column 24:
At claim 22, line 1, "22" should read --21--.

Column 25:
At claim 27, line 3. "th" should read --the--.

At claim 33, line 1, "ot" should read --of--.

UNITED STATES PATENT AND TRADEMARK OFFICE
CERTIFICATE OF CORRECTION

PATENT NO. : 5,017,347
DATED : May 21, 1991
INVENTOR(S) : William Robert Epperly, et al.

It is certified that error appears in the above-indentified patent and that said Letters Patent is hereby corrected as shown below:

Column 30, claim 41, line 12, "creat" should read --create--.

Signed and Sealed this

First Day of November, 1994

*Attest:*

BRUCE LEHMAN

*Attesting Officer*     *Commissioner of Patents and Trademarks*